United States Patent [19]

Mehnert et al.

[11] Patent Number: 5,475,302
[45] Date of Patent: Dec. 12, 1995

[54] INDUCTIVE PICK-UP FOR PRODUCING A SIGNAL REPRESENTING THE RELATIVE POSITIONS OF TWO MUTUALLY MOVABLE BODIES

[75] Inventors: Walter Mehnert, Grillparzerstrasse 6, 8012 Ottobrunn; Thomas Theil, Feldafing, both of Germany

[73] Assignee: Walter Mehnert, Ottobrunn, Germany

[21] Appl. No.: 929,527

[22] Filed: Aug. 14, 1992

[30] Foreign Application Priority Data

Aug. 16, 1991 [DE] Germany .......................... 41 27 209.9

[51] Int. Cl.⁶ ............................. G01B 7/14; G01B 7/30
[52] U.S. Cl. ................... 324/207.17; 324/207.22
[58] Field of Search ............... 324/202, 207.16–207.19, 324/207.22–207.25, 225, 239, 243

[56] References Cited

U.S. PATENT DOCUMENTS

| | | | |
|---|---|---|---|
| 2,964,716 | 12/1960 | Berman | 324/207.17 X |
| 3,045,227 | 7/1962 | Minas | 324/207.17 UX |
| 3,732,553 | 5/1973 | Hardway, Jr. | 324/662 UX |
| 3,786,459 | 1/1974 | Berger | 324/207.17 X |
| 3,949,339 | 4/1976 | Kennedy . | |
| 4,013,911 | 3/1977 | Fujiwara et al. | 324/207.17 X |
| 4,695,795 | 9/1987 | Nakamizo et al. | 324/207.25 X |
| 4,878,020 | 10/1989 | Kärnä al. | 324/207.17 |
| 5,107,212 | 4/1992 | Dobler et al. | 324/207.22 X |
| 5,323,109 | 6/1994 | Mehnert et al. | 324/207.22 X |

FOREIGN PATENT DOCUMENTS

| | | |
|---|---|---|
| 28971 | 5/1981 | European Pat. Off. . |
| 210927 | 2/1987 | European Pat. Off. . |
| 2278141 | 2/1976 | France . |
| 1217085 | 5/1966 | Germany . |
| 2511683 | 2/1978 | Germany . |
| 2449697 | 11/1979 | Germany . |
| WO90004152 | 4/1990 | WIPO . |

*Primary Examiner*—Sandra L O'Shea
*Assistant Examiner*—Warren S. Edmonds
*Attorney, Agent, or Firm*—Sughrue, Mion, Zinn, Macpeak & Seas

[57] ABSTRACT

A pick-up for the inductive production of a measurement signal reproducing the relative position of first and second bodies which are movable relative to each other includes at least one exciter coil operable with alternating current for the production of a magnetic flux, a measurement coil arrangement at which voltages from which the measurement signal is derived can be taken off, and a flux guide means of ferromagnetic material for carrying the magnetic flux produced by the exciter coil on a closed measurement path in such a way that at least a part of the magnetic flux passes through the measurement coil arrangement, and at least one of the voltages which can be taken off at the measurement coil arrangement changes in dependence on the movement of one of the bodies relative to the other. To achieve a high degree of measurement accuracy and characteristic fidelity, the measurement signal is formed as a quotient of first and second intermediate signals of which at least one depends on the instantaneous position of one of the bodies relative to the other, and each of the intermediate signals involves differences of voltages which the measurement coil arrangement supplies.

36 Claims, 6 Drawing Sheets

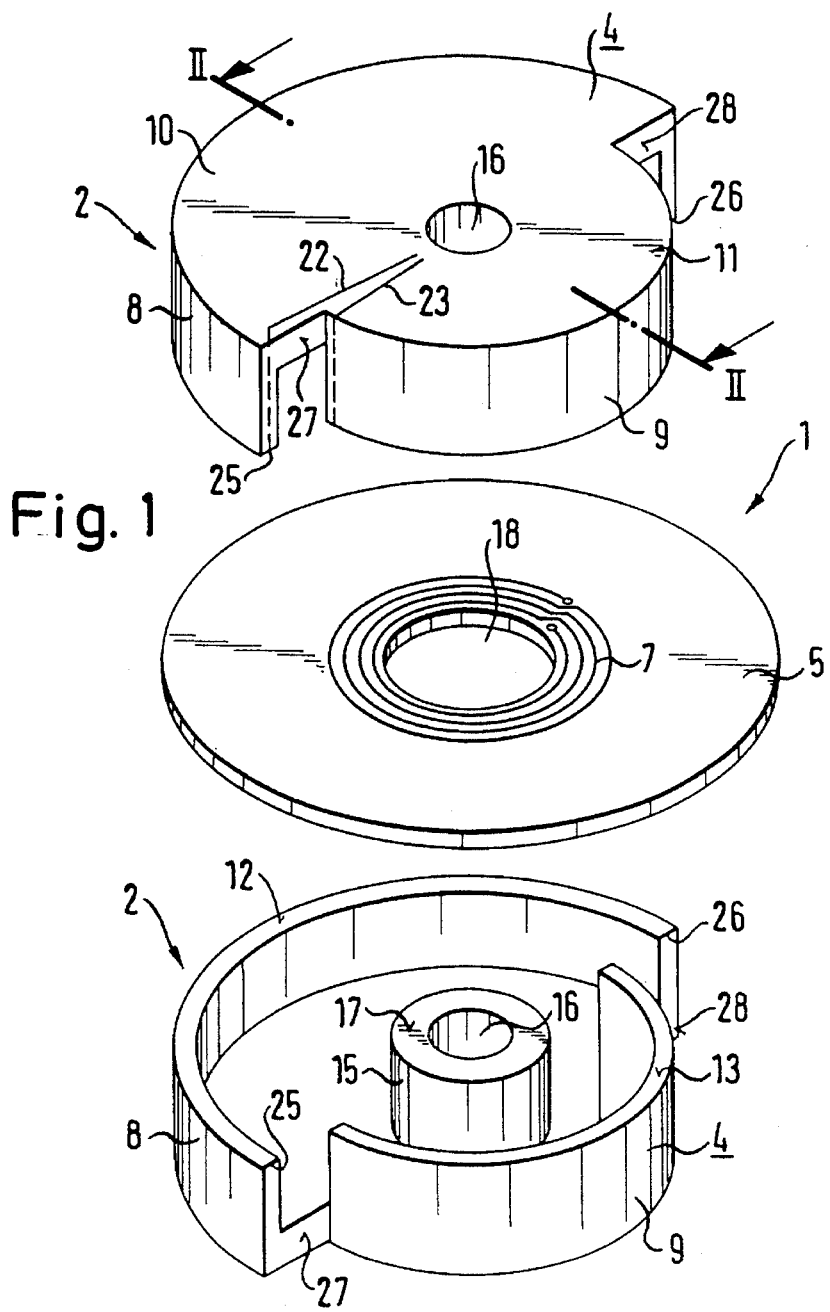

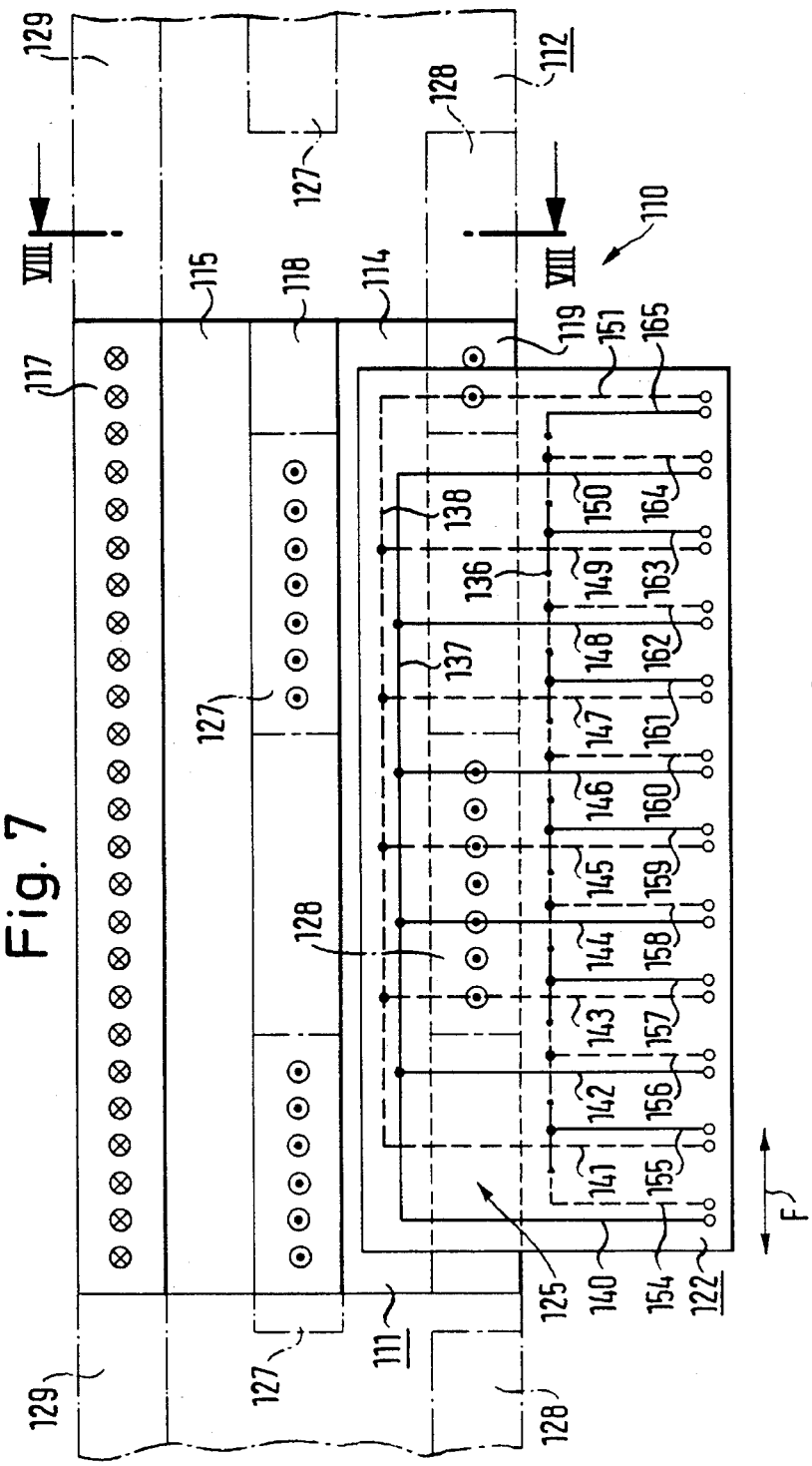
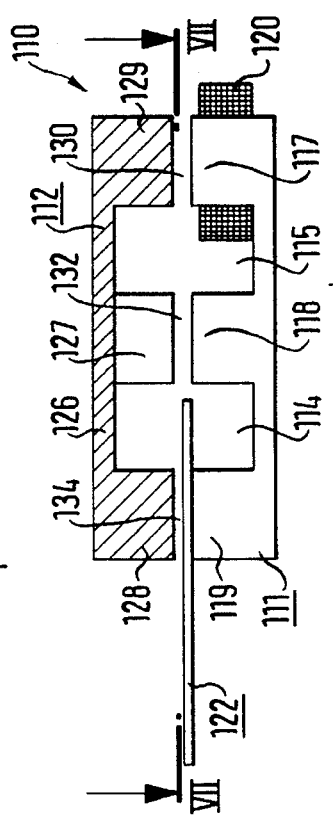

1

INDUCTIVE PICK-UP FOR PRODUCING A SIGNAL REPRESENTING THE RELATIVE POSITIONS OF TWO MUTUALLY MOVABLE BODIES

BACKGROUND OF THE INVENTION

The invention relates to a pick-up for the inductive production of a measurement signal which reproduces the position of first and second mutually movable bodies.

Position pick-ups or sensors for that purpose serve to generate an electrical signal, by means of which it is possible to monitor or trace and measure a continuously or intermittently occurring relative movement between first and second bodies, in such a way that at any moment information is available about the instantaneous position of one of the bodies relative to the other.

One alternative configuration of such a pick-up may be a linear pick-up or sensor with which for example the movement and/or instantaneous position of a machine carriage which is displaceable relative to a machine frame structure is to be detected and controlled with a high degree of precision. That situation requires the constant production of a signal which provides information about the instantaneous position of the carriage, even when the carriage is moving at high speed.

Another pick-up construction is represented by a rotary pick-up or sensor for measuring the instantaneous angular position of a rotating body, for example the rotor of an electric motor relative to the stator, or the rotary angle between two bodies which are rotatable relative to each other, for example the azimuth or vertical angle of the telescope of a theodolite.

In a similar fashion, a rotary pick-up or sensor can be used to measure the angular positions or speeds of rotation of motor vehicle wheels or the instantaneous angular position of a carburettor butterfly valve.

A linear pick-up can be found in German patent specifications Nos 25 11 683 and 26 17 624. Those pick-ups each include a ferromagnetic flux guide means having two rectangular elongate flat plates which are arranged in mutually parallel relationship in such a way that they enclose an air gap between their flat sides. At one of the two short sides of the rectangular configuration, those plates are connected by a limb portion extending perpendicularly to the planes of the plates, in such a way as to define a U-shaped cross-section. The limb portion extends through an exciter coil which is fed with alternating current to generate a magnetic flux which can follow an annularly closed path, across the air gap, with a substantially homogeneous magnetic field being produced in the air gap.

That flux guide means is connected to one of the two mutually movable bodies while coupled to the other body is a measurement coil arrangement which is in the form of a printed circuit and which has two measurement coils of which each includes a plurality of windings, each embracing a respective surface element.

The surface elements which are formed in that way are of different sizes and are arranged in interleaved relationship with each other. All in all, that arrangement gives an elongated measurement coil configuration which extends in the direction of the movement to be monitored, and defines the maximum width thereof. The carrier board of the measurement coils is disposed between the two plates of the flux guide means and parallel to the plates. Projection, in the direction of the magnetic flux, of the mutually oppositely coincidentally disposed wall surfaces of the air gap between the plates, on to the surface of the carrier board and thus the measurement coil, defines there a substantially rectangular transit surface, the longitudinal direction of which extends perpendicularly to the direction of movement transversely over the entire measurement coil arrangement, and the width of which, in the direction of movement, is substantially shorter than the maximum width of movement. The main part of the magnetic flux which crosses over in the gap passes through the measurement coil arrangement in the above-mentioned transit surface, although considerable leakage flux components may also occur which extend outside that purely geometrically defined transit surface and which at least in part also pass through the surface elements of the measurement coil arrangement.

If one of the two bodies to be monitored moves relative to the other body, then the transit surface is displaced over the surface elements of the measurement coil arrangement whereby the magnetic flux passing through the individual windings changes so that the measurement coils respectively produce an electrical output signal of variable amplitude. The output ac voltage signals produced by the measurement coils are rectified to form a measurement signal, the magnitude of which is characteristic in respect of the instantaneous position which one of the bodies occupies relative to the other. In order to produce a measurement signal which is symmetrical relative to the zero potential associated with the central position, the measurement coils are of such a configuration and are so arranged in mirror image relationship with each, other that regions of the transit surface which, upon movement of the bodies, leave the condition of overlap with the one measurement coil, pass into a condition of overlap with the other measurement coil and vice-versa; in that situation, the difference in the voltages which are supplied by the measurement coils is to follow a linear configuration as accurately as possible, over as large a part as possible of the range of the movement to be monitored. In the case of configurations in which another output signal characteristic is to be achieved, it is desirable in a corresponding fashion for the characteristic line which is theoretically predetermined by the selected configuration to be maintained as accurately as possible over the entire range of movement.

In addition, the step of forming the difference from the voltages produced by the measurement coil signals is intended to ensure eliminating additive interference values from the measurement signal.

However it has only been possible hitherto to attain both those aims to an inadequate degree. Thus it can be seen for example from German patent specification No 25 11 683 that the linear configuration of the measurement signal characteristic, which that arrangement seeks to achieve, terminates not in a sharp point but a rounded point, when approaching the two limit positions. It is also found in practice that the characteristic of such an arrangement also extends not linearly but distorted in an S-shaped form, in the region of the passage through zero. Although such non-linearities can be partially compensated by means of the electronic circuitry disposed on the output side of the pick-up or sensor, that however involves additional structure and thus increased costs.

It is further found that a measurement signal which is obtained by the above-indicated difference-forming step still includes major interference signal components which cannot be properly eliminated by the difference-forming operation.

SUMMARY OF THE INVENTION

An object of the present invention is to provide an inductive pick-up which is of a structure of the maximum reasonable simplicity and low cost.

Another object of the present invention is a pick-up for the inductive production of a measurement signal which reproduces the position of one of first and second mutually movable bodies, such that the measurement signal produced follows the construction characteristic configuration with a high degree of accuracy over a part of the range of movement which is as large as reasonably possible, while being at least substantially free from interference signal components.

The foregoing and other objects are attained by a pick-up according to the invention as set forth herein.

The structure of the present invention is substantially based on the following considerations:

a) the interference signal components which are still present in the measurement signal, in the case of prior pick-ups or sensors, are multiplicative in nature and therefore can only be eliminated by quotient formation in respect of two signals, in which they are approximately uniformly involved; and b) if that quotient formation operation were to be effected in a more advanced form, for example using the sum and the difference of the two voltages $U_4$ and $U_5$, as are supplied by the arrangement in accordance with German patent specification No 26 17 624, the result of that would be that the additive components become fully effective again.

In accordance with the invention therefore the quotient formation operation is effected by means of two intermediate signals, each of which comprises one or more differences of voltages, in which the additive interference values are involved in the same manner. In order to be able to form those intermediate signals, the invention therefore always provides for the production of at least two voltage differences, for example $\Delta U_1$ and $\Delta U_2$, from which then for example quotients of the kind $\Delta U_1/\Delta U_2$ or $\Delta U_1/(\Delta U_1-\Delta U_2)$ or $\Delta U_1/(\Delta U_1+\Delta U_2)$ or $(\Delta U_1-\Delta U_2)/(\Delta U_1+\Delta U_2)$ etc can be formed and used as measurement signals. In that respect, particularly advantageous are those quotients which have a linearly varying numerator and a constant denominator because that then gives a linear measurement signal configuration and there cannot be any division by zero. Depending on the configuration of the measurement coil arrangement, the quotients $$\frac{\Delta U_1 - \Delta U_2}{\Delta U_1 + \Delta U_2} \quad \text{or} \quad \frac{\Delta U_1 + \Delta U_2}{\Delta U_1 - \Delta U_2}$$

or expressions corresponding to those quotients have those properties which are to be preferred.

In a particularly advantageous manner, the at least two difference signals for producing the intermediate and measurement signals according to the invention can be achieved by the measurement coil arrangement comprising at least two groups of surface elements which are arranged in displaced relationship with each other in the direction of movement or displacement and each of which has two surface elements, over which passes the transit surface defined by the flux guide means. The voltages of the measurement coil windings which enclose the surface elements of the one group can then be used to form $\Delta U_1$ while the surface elements of the other group supply $\Delta U_2$. Because of the displaced arrangement of the two groups, in the direction of movement, $\Delta U_1$ and $\Delta U_2$ have different values in dependence on the position to be measured.

In order for the above-indicated configuration to be made linear, it is preferably provided that the surface elements and the transit surface are geometrically similar to each other and in particular are in the shape of elongate quadrangles, the long sides of which extend substantially parallel to each other and to the direction of displacement, while the short sides extend perpendicularly to the direction of displacement. That also includes those surface elements and transit surfaces which, as is particularly advantageous in relation to rotary pick-ups or sensors, are in the form of part-circular rings arranged concentrically with respect to the axis of rotation of the movement to be monitored. The 'long sides' of those surfaces are then the inner and outer peripheral arc portions which are 'parallel' in the sense that they are disposed concentrically relative to each other. In that arrangement the 'short sides' which are perpendicular to the direction of displacement extend in the radial direction.

In order to avoid falsifications in the difference signals and therewith also the measurement signal being caused by surface regions which lie between the surface elements of a group, those surface elements have at least one common edge portions which extends perpendicularly to the direction of movement. That edge portion is formed by an edge conductor which belongs to the two measurement coil windings which are electrically connected together in that way and which embrace the two surface elements, or by two edge conductors of which one belongs to one measurement coil winding and the other belongs to the other measurement coil winding and which, as viewed in the direction of the magnetic flux, are arranged in congruent relatioship in succession as a small spacing.

In both cases, that arrangement provides that, upon displacement of the transit surface beyond that edge portion, each magnetic flux line which leaves the one surface element must necessarily pass through the respective other surface element.

In the case of rotary pick-ups or sensors in which the two surface elements of each group are in the form of semicircular rings which supplement each other to define a full circular ring, there are two edge regions of that kind, which are then preferably both of the above-described design configuration.

Difference signals with a particularly high degree of accuracy and freedom from interference signals can be produced if the two surface elements are enclosed by a common measurement coil winding. In the case of linear pick-ups or sensors, the edge region separating the two surface elements from each other is then formed by a pair of connecting conductors which preferably extend perpendicularly to the direction of displacement and at which the desired difference voltage $\Delta U_1$ and $\Delta U_2$ can be directly taken off. In the case of rotary pick-ups or sensors, in addition thereto there is also a separating limb portion which is in diametrally opposite relationship to the radially extending connecting conductors and which is formed by a radially extending conductor portion which is either electrically conductively fixedly connected to both peripherally extending, circularly closed edge conductors, or whose electrically conductive connection to one of said edge conductors can be opened or closed by way of a controllable on/off switch.

The latter affords the advantage that a measurement coil arrangement can be provided on a carrier board or plate member with only two conductor track planes, so that it has more than two groups which are arranged in mutually displaced relationship in the direction of displacement, each group comprising two surface elements which can be selectively activated and de-activated in dependence on the displacement of the transit surface, by opening and closing of the on/off switches. That is effected by a procedure which provides for always activating those ones of the two groups, in which the edges of the transit surface which are at the front and at the rear respectively in the direction of displacement are at the greater spacings from the edge regions of those groups, to produce the difference signals $\Delta U_1$ and $\Delta U_2$. In that way, over the entire measurement range, it is possible to obtain difference, intermediate and measurement signals which are free from non-linearities which necessarily occur when the edges of the transit surface or surfaces approach the edge regions of the surface elements.

Further objects, features and advantages of the invention will be apparent from the following description of preferred embodiments.

BRIEF DESCRIPTION OF THE DRAWINGS

FIG. 1 is an exploded view of the mechanical structure of a rotary pick-up,

FIG. 2 is a view in section through the rotary pick-up shown in FIG. 1, taken along line II—II, FIG. 7 is a diagrammatic plan view of a linear pick-up or sensor, FIG. 8 is a view in section through the linear pick-up in FIG. 7, taken along line VIII—VIII.

DESCRIPTION OF THE PREFERRED EMBODIMENTS

Figure 3:
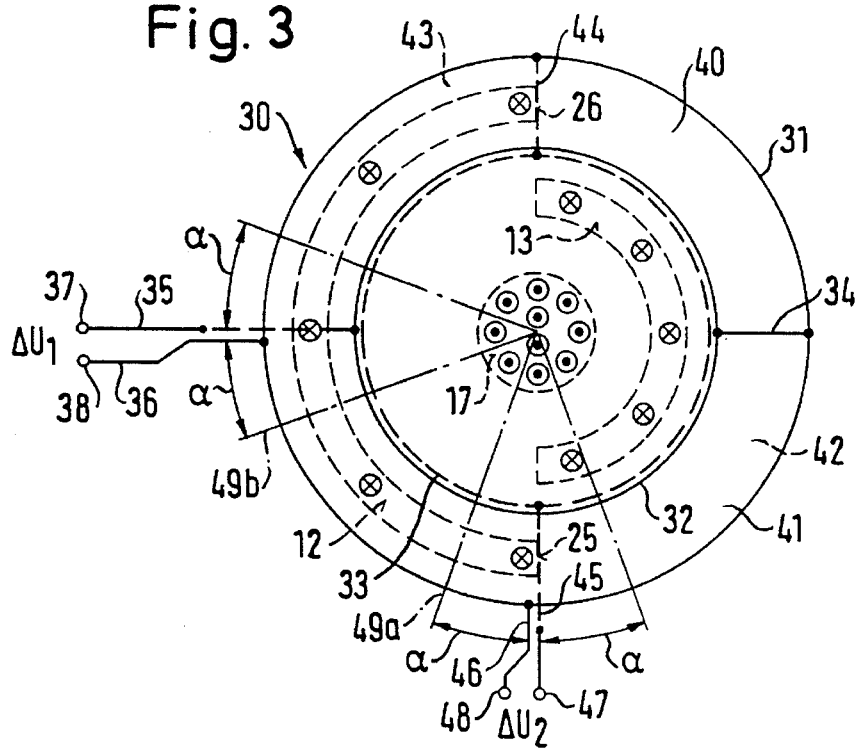
FIG. 3 shows a measurement coil arrangement for the rotary pick-up of FIGS. 1 and 2, with two groups of surface elements, which are displaced through 90° relative to each other.

The rotary pick-up or sensor 1 shown in FIGS. 1 and 2 has a flux guide means 2 which comprises two identical core shells 4, 4 and a carrier board or plate member 5 on which there are disposed, in the form of printed circuits, both an exciter coil 7 and also measurement coils which are not shown in FIG. 1 and which will be described in greater detail hereinafter with reference to FIGS. 3–6.

Each of the two core shells 4, 4 comprises two hollow semi-cylinders which are integrally connected together and which are of different radii and which are so arranged that their cylinder axes and their edges, which extend along the respective cylinder diameter, coincide, while their outwardly curved semi-cylindrical walls 8, 9 are oriented away from each other.

At one end, each of the two semi-cylinders is closed off by an end wall 10, 11, the shape of which accurately corresponds to its semi-cylindrical cross-section. The two end walls 10, 11 can be of the same axial thickness and integrally blend into each other. At the end which is opposite to the end walls 10, 11, the semi-cylindrical walls 8, 9 have free end faces 12, 13, each of which is in the shape of half a circular ring. Extending from the end walls 10, 11 in the same direction as the semi-cylindrical walls 8, 9 is a centrally disposed, integrally connected projection 15, the axial height of which is greater than that of the semi-cylindrical walls 8, 9. A concentric bore 16 extends through the projection 15 in the longitudinal direction, and can serve to receive a shaft about which the two bodies, whose positions relative to each other are to be monitored and measured, are rotatable. In the assembled condition the two core shells 4, 4 are fixedly connected together so that the free end faces 17, 17 of the projections 15, 15 bear against each other, with the bores 16, 16 being aligned with each other and the end faces 12, 12 and 13, 13 respectively of the semi-cylindrical walls 8, 8 and 9, 9 respectively being disposed in spaced opposite relationship, enclosing the gaps 20, 21 between them.

The carrier plate member 5 is in the form of a circular disk having a central opening 18, the diameter of which is somewhat larger than the outside diameter of the projections 15, 15. The outside diameter of the carrier plate member 5 is somewhat larger than the diameter of the two larger semi-cylindrical walls 8, 8.

As can be seen from FIG. 2, the carrier plate member 5 is so arranged that the two projections 15, 15 extend through the central opening 18 thereof and it extends parallel to the end walls 10, 11 of the core shells 4, 4, extending through the gaps 20, 21.

On its side which is upward in FIG. 1, the carrier plate member 5 has the exciter coil 7 which is of a spiral configuration and which immediately surrounds the central opening 18. Instead of that exciter coil which is in the form of a printed circuit, it is also possible for a cylinder coil which is wound from wire to be disposed in that region.

In operation, the carrier plate member 5 is non-rotatably connected to one of the two bodies (not shown) whose rotary movement is to be monitored and measured, while the flux guide means 2 which is formed from the two core shells 4, 4 is non-rotatably connected to the other of those two bodies.

The magnetic flux generated by the exciter coil 7 is offered two substantially symmetrical, annularly closed paths which have substantially the same reluctance. One of those paths which serves as the measurement path extends through the two projections 15, 15 by way of the two end walls 10, 10 with the greater radius, through the semi-cylindrical walls 8, 8 and over the gap 20 enclosed between those semi-cylindrical walls, with the magnetic flux following that path being able to pass through measurement coils disposed on the carrier plate member 5. The other of the two paths passes through the projections 15, 15 by way of the end walls 11, 11 of smaller radius, by way of the semi-cylindrical walls 9, 9 and the gap 21. There are no measurement coils provided in the region of that path. On the contrary it serves as a compensating path which carries the magnetic flux passing therethrough past the measurement coil arrangement and, by virtue of symmetrical division of the total flux, provides for improved accuracy and characteristic fidelity. However the compensating path can also be used as a measurement path if an increased level of expenditure is accepted, for example a third, circularly closed conductor.

It can be seen in particular from FIG. 2 that the semi-cylindrical walls 9, 9 with the smaller radius form an almost closed screening arrangement, outside which only weak leakage fields occur. That means that the parts of the measurement coils which, by virtue of the instantaneous relative angular position, are disposed on the side of the semi-cylindrical walls 9, 9 of smaller radius and thus outside the flux guide means 2 are exposed to only very small leakage fluxes coming from the exciter coil 7.

Symbolically shown in the upper core shell in FIG. 1 are two magnetic flux lines 22, 23 which extend radially and which then bend over downwardly and which extend directly one beside the other in the radial region in such a way that one thereof, namely the flux line 23, is just extending in its vertical part through the semi-cylindrical wall 9 of smaller radius while the flux line 22 is already extending through the semi-cylindrical wall 8 of larger radius. It will be seen that the two flux lines can follow those different paths, completely undisturbed. In other words, unlike the situation in the state of the art, there are scarcely any field distortion phenomena at the gap edges 25, 26 which lead or trail, depending on the respective direction of rotary movement, as almost no leakage flux lines pass along the free end faces 27, 28 of the flux guide means 2.

Figure 4:
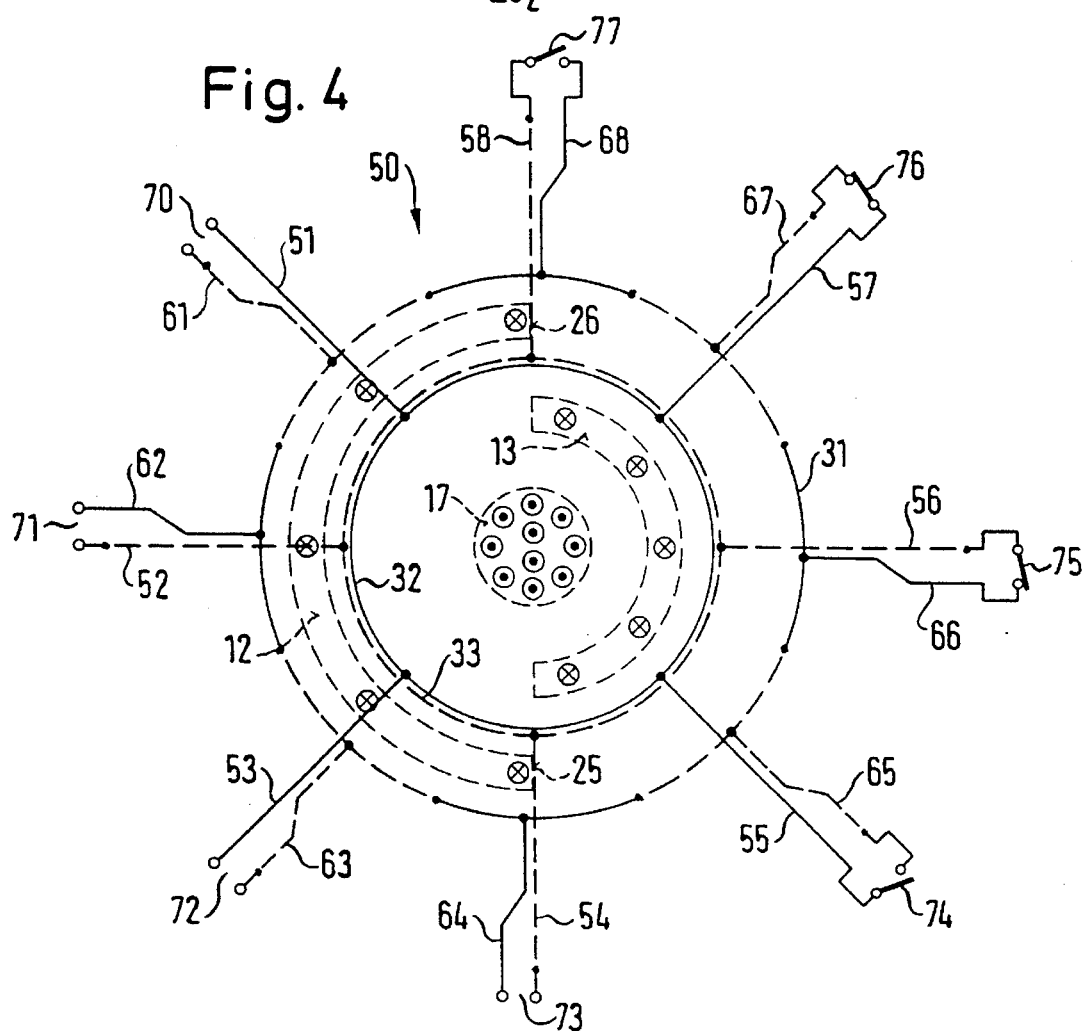
FIG. 4 shows a measurement coil arrangement for the rotary pick-up of FIGS. 1 and 2, with four groups of surface elements, which are each displaced through 45° relative to each other and which can be activated and de-activated by controllable switches.
Figure 5:
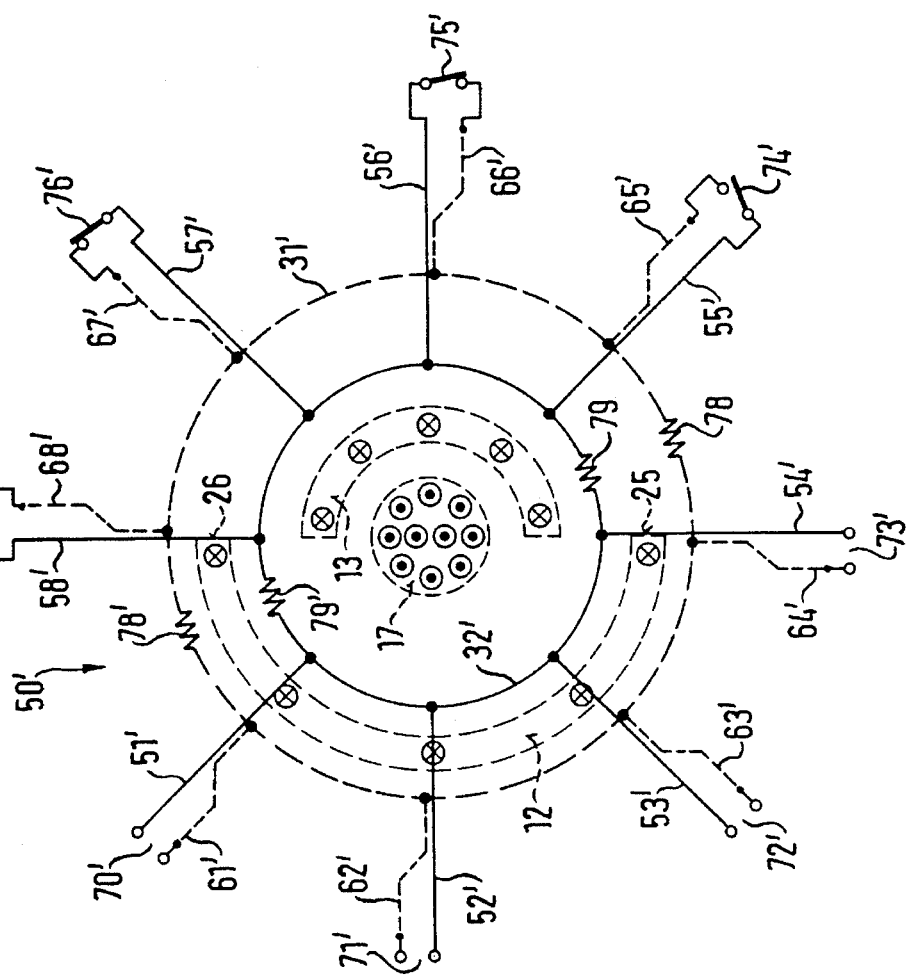
FIG. 5 shows a measurement coil arrangement corresponding to that shown in FIG. 4, for single-channel signal processing.

The described rotary pick-up or sensor is distinguished by involving a high level of symmetry and also the fact that the part of the flux guide means 2, which passes through the exciter coil and which is formed by the two projections 15, 15, does not have any air gap. As a result, extraneous fields, because of the low level of reluctance, are always passed through the projections 15, 15 and are thus kept away from the measurement coil arrangement. It is possible to use with the flux guide means 2 for a rotary pick-up, as shown in FIGS. 1 and 2, any of the measurement coil arrangements 30, 50, 80 which are illustrated in FIGS. 3–5 and which are particularly advantageous for respective other situations of use, by virtue of their different properties.

A common aspect oil the views shown in FIGS. 3–6 is that they each show the measurement coil arrangement in a plan view parallel to the axis of rotation of the rotary pick-up or sensor, the upper core shell 4 of the flux guide means 2, the contours of the carrier plate member 5 and the exciter coil 7 being omitted. Of the lower core shell 4, the views show only the outside contour of the end face 17 of the projection 15, the end face 13 of the semi-cylindrical wall 9 of smaller radius and the end face 12 of the semi-cylindrical wall 8 of larger radius. The last-mentioned end face 12, together with the end face 12 of the other core shell 4, which is in opposite congruent relationship therewith, define the transit surface which is displaced upon a rotary movement relative to the surface elements of the measurement coil arrangements in the peripheral direction.

The circles in the end faces 12, 13 and 17 symbolically represent the magnetic flux which passes through those surfaces, illustrating in each case a moment at which the magnetic flux is extending away from the viewer through the end faces 12 and 13 and towards the viewer through the end face 17 of the projection 15.

Insofar as conductors or conductor portions in FIGS. 3–6 are shown in solid lines, they are disposed on the side of the carrier plate member 5 which is towards the viewer, while conductors or conductor portions which are shown by broken lines are disposed on the underside of the carrier plate member 5. Points at which a conductor track changes from one side of the plate member to the other, with the parts extending at top and bottom being electrically conductively connected together, are indicated by a dot-shaped increase in thickness. Wherever solid-line and broken-line conductor track portions are shown in parallel relationship at a small spacing, that is only for the sake of improved illustration in the drawing. In actual fact, those conductor track portions extend in congruent relationship one above the other, in the direction of viewing on to FIGS. 3–6. The output terminals of the measurement coil turns and the connections to switches and amplifiers are only symbolically illustrated and can be of any suitable form.

The measurement coil arrangement 30 shown in FIG. 3 includes a closed, outer, circular conductor 31 which is arranged concentrically with respect to the axis of rotation and which is of a radius which is somewhat larger than the outside radius of the end face 12, and two closed inner circular conductors 32, 33 which are of the same size and which are arranged in congruent relationship one behind the other and which are also concentric with respect to the axis of rotation, their radius being somewhat smaller than the inside radius of the end face 12 but larger than the outside radius of the end face 13.

The outer circular conductor 31 is electrically conductively connected to the inner circular conductor 32 by a radially extending conductor portion 34, while displaced through 180° relative thereto, that is to say diametrally opposite same, is a connecting conductor 35 which is electrically conductively connected to the inner circular conductor 32 and, starting from same, extends radially outwardly in the lower conductor track plane. In that respect, it is electrically insulated from the outer circular conductor 31 which is disposed on the upper conductor track plane and which in turn is electrically conductively connected to a connecting conductor 36 which initially extends in the upper conductor track plane radially outwardly in congruent relationship with the connecting conductor 35. It is only at a radial spacing at which there are certain to be no further noticeable leakage fluxes, that the two connecting conductors 35, 36 extend separately from each other, in order to provide space for the connecting contacts 37, 38.

The conductors 31, 32, 34 and 35 enclose the two surface elements 40, 41 of a first group, each of which is in the form of a semi-circular ring and which directly adjoin each other in such a way that they supplement each other to form a full circular ring; they are separated from each other by the separating limb portions formed by the conductor portions 34 and 35. The two surface elements 40, 41 are geometrically similar to the transit surface defined by the end face 12 and extend in the peripheral direction which is here the same as the direction of displacement, in each case precisely as far as same, namely over 180°. In the direction perpendicular to the direction of displacement, the surface elements 40, 41 are of larger dimensions than the transit surface so that the magnetic leakage fluxes which cross over at the radially inner and outer edges of the gap 20 formed by the two end faces 12, 12 (see FIG. 2) remain with their measurable components as far as possible entirely within the surface elements 40, 41.

The essential difference in respect of the measurement coil arrangement formed by the surface elements 40, 41, in relation to similar arrangements as are described for example in earlier German laid-open application (DE-OS) No 41 13 745, is that in this case it is not only the inner circular conductor 32 but also the outer circular conductor 31, that is completely closed.

In an arrangement in which the outer conductor 31 is separated where the connecting conductor 35 extends outwardly, and its two free ends are each passed outwardly with a respective specific connecting conductor, it will be clear that, between the three connecting conductors, it is possible to tap off ac voltages $W_1$ and $W_2$ whose amplitude depends on the position-dependent magnitude of the magnetic fluxes which pass through the surface elements 40, 41.

In the position of the end face 12 shown in FIG. 3, those two voltages $W_1$ and $W_2$ would be of equal magnitude. After a rotary movement through 90°, by virtue of which the end face 12 has moved upwardly to such an extent that the magnetic flux issuing therefrom still passes through the surface element 40, with the exception of the leakage components at the end edges 25, 26, the voltage $W_1$ supplied by that surface element would assume its maximum and the voltage $W_2$ supplied by the surface element 41 would assume its minimum which however is not exactly equal to zero, because of the above-mentioned leakage fluxes.

Conversely, after a rotary movement through 90° in the opposite direction, the voltage $W_1$ would reach its minimum and the voltage $W_2$ would reach its maximum, while after a rotary movement through 180°, the voltages $W_1$ and $W_2$ would again be equal. If the difference between those two voltages were to be formed, namely $\Delta W=W_1-W_2$, then, for the illustrated position, that would give the value zero for the illustrated position, for the two described rotary movements through 90° that would give a positive and a negative extreme respectively, and after a rotary movement through 180°, that would again give the value zero. Between those values, the envelope curve in respect of the ac voltage $\Delta W$ would exhibit a substantially triangular configuration which affords very good linearity in the region of the passages through zero but which becomes progressively worse in the region of the tips of the triangles, in proportion to an increasing degree of approach of one of the two end edges 25, 26 of the end face 12, to the separating limb portion 34 or the connecting conductor 35. That is to be attributed to the fact that leakage fields lead and trail those edges 25, 26 respectively, and the proportions of such leakage fields which cross over into the adjacent surface element 40 or 41 which is not covered by the end face 12 at that location increase with decreasing angular spacing between the respective end edge 25 or 26 and the conductor 34 or 35 respectively.

Surprisingly, when the conductor 31 is not interrupted as assumed above but completely closed as shown in FIG. 3, then between the two connecting conductors 35, 36 there is an output signal $\Delta U_1$ which is precisely of the configuration of the above-described difference signal $\Delta W$ and which is only of a diminished amplitude in comparison therewith. Like the difference signal $\Delta W$, the signal $\Delta U_1$ also has the property that eliminated therefrom are all additive interference influences which, in the above-discussed arrangement with interrupted outer conductor 31, are equally involved in the two partial voltages $W_1$ and $W_2$.

In addition the difference signal $\Delta U_1$ which can be taken off at the connections or terminals 37, 38 in FIG. 3 affords the extremely surprising advantage that it is affected by interference values substantially less than the difference signal $\Delta W$ formed from separately produced voltages $W_1$ and $W_2$. That is also because for example the short-circuit currents which inevitably flow in the closed conductor loops 31, 22, 33 have both a linearising effect and a symmetrising effect, in particular in relation to the passage through zero. As a result the difference signal $\Delta U_1$ is very well suited for use for forming a first intermediate signal which in turn is utilised in accordance with the invention to form the actual measurement signal.

The second difference signal $\Delta U_2$ which in accordance with the invention is required to derive intermediate signals is obtained by means of a second group of surface elements 42, 43 which are of the same form as the surface elements 40, 41 and which are disposed in congruent relationship therewith in the radial direction but which are turned with respect thereto through 90° in the peripheral direction. The surface elements 42, 43 of the second group are defined in the radial direction by the outer circular conductor 31 and the inner circular conductor 33 and are separated from each other by the conductor portion 44 which electrically conductively connects together the two circular conductors 31 and 33, and the connecting conductor 45 which extends from the inner circular conductor 33 to which it is electrically conductively connected, radially outwardly beyond the outer circular conductor 31 from which it is electrically insulated at the cross-over point. The connecting conductor 45 is disposed in diametrally opposite relationship to the separating limb portion 44. Initially extending in congruent relationship therewith is a connecting conductor 46 which is electrically conductively connected to the outer circular conductor 31. Radially somewhat further outwardly, the two connecting conductors 45, 46 no longer extend in congruent relationship and they terminate at connecting contacts 47, 48 at which the second difference voltage $\Delta U_2$ can be taken off.

As the two groups of surface elements 40, 41 and 42, 43 are of an identical structure, the foregoing description relating to $\Delta U_1$ applies in the same manner to the voltage $\Delta U_2$. The only difference is that $\Delta U_2$ is also displaced through 90° relative to $\Delta U_1$.

The two difference signals $\Delta U_1$ and $\Delta U_2$ are used in accordance with the invention for forming intermediate signals from which the actual measurement signal is formed as a quotient. Such intermediate signals can for example be the difference signals $\Delta U_1$, $\Delta U_2$ themselves, although that would result in a non-linear configuration in respect of the measurement signal $\Delta U_1/\Delta U_2$ formed in that way. Therefore, the difference ... $\Delta U_1-\Delta U_2$ and the sum ... $\Delta U_1+\Delta U_2$ preferably serve as the intermediate signals, which results in a measurement signal of the following form:

$$\frac{\Delta U_1 - \Delta U_2}{\Delta U_1 + \Delta U_2} \quad (1)$$

which is of a linear configuration because of the constant nature of the denominator. The situation where $\Delta U_1$ becomes equal to $\Delta U_2$ does not involve any division, due to zeroing, whatsoever. The measurement signal formed in that way is free not only from additive but also multiplicative interference values and affords a degree of measurement accuracy, characteristic fidelity and characteristic symmetry, as hitherto could not be achieved.

It will be noted that the extremely accurate linear configuration in respect of the difference signals $\Delta U_1$ and $\Delta U_2$ with the embodiment shown in FIG. 3 can be achieved only for an angular range of <360°.

As already indicated above in respect of the signal $\Delta W=W_1-W_2$, the system also provides, for the signals $\Delta U_1$ and $\Delta U_2$, angular ranges $2\infty$ which are disposed symmetrically relative to the separating limb portions 34, 35 or the connecting conductors 35, 45 and in which a signal $\Delta U_1$ and $\Delta U_2$ respectively can admittedly be obtained, but the configuration thereof departs from linearity to an increasing extent, in direct proportion to one of the end edges 25, 26 approaching one of the conductors 33, 44 and 35, 45 respectively. The higher the level of requirements in respect of linearity, the greater must be those angular ranges $2\propto$ which can no longer be put to use for producing a linear measurement signal. If the requirements in respect of linearity are low, then for example a value of $\propto=15°$ may certainly be sufficient while for high levels of accuracy a value of $\propto=30°$ or even $\propto=45°$ must be chosen.

In general terms, the arrangement shown in FIG. 3 makes available four mutually separate measuring ranges each of $90°-2\propto$, each of which covers 60°, when the levels of requirement in respect of linearity are low. With a very high level of accuracy, it is only possible to use the measuring range which extends in the clockwise direction from the broken line 49a to the broken line 49b, which is sufficient in many cases.

If there is a wish to cover larger measurement angles, with a high level of accuracy, it is possible to provide three or four of the groups of surface elements shown in FIG. 3, which are then arranged in mutually displaced relationship through 60° or 45° respectively, relative to each other. That arrangement then provides three or four difference signals although only two thereof are used at a given time for the above-discussed operation of forming the intermediate signals and the quotient. They are then the two difference signals from the groups of surface elements, in which the end edges 25, 26 of the transit surface are at the greater angular spacings from their separating limb portions or output conductors, at the moment in question.

With three such groups of surface elements, each of which supplies a correspondingly linear difference signal over a measurement range of $120°-2\propto$, it is possible by suitable switching-over to cover the entire range of 360° if $\propto$ must not be greater than 30°. In those switching-over operations, the absolute symmetry which is achieved by virtue of the closed conductor loops and which cannot be achieved by simple difference formation is an aspect of especial advantage.

If there is a requirement for linearity for which $\propto$ must be equal to 45°, that can be achieved with four groups of surface elements of the above-described kind, which are displaced relative to each other through 45° respectively. It will be noted however that those fixed-wiring design configurations can no longer be carried into effect, with two conductor track planes. The larger the number of conductor track planes employed, the greater are the problems that arise in regard to accuracy of adjustment with which the surface elements of the various groups must be brought into alignment in the radial direction.

In order to avoid those difficulties, it is possible to adopt the solution shown in FIG. 4, which involves the use of two conductor track planes for the formation of four groups, each of two surface elements, each of which extends over 180°. For that purpose, besides a closed circular outer conductor 31 which in this case repeatedly changes from one conductor track plane to another, and two closed circular inner conductors 32, 33 which are arranged in congruent relationship one behind the other (which, like the conductor 31, precisely correspond in dimensions and arrangement to the above-described conductors which are identified by the same references), the measurement coil arrangement 50 also has eight radially extending conductor portions 51–58 which are arranged at angular spacings each of 45°, in such a way that they are disposed in pairs in mutually opposite relationship.

The conductor portions 51–58 are alternately electrically conductively connected to one or other of the two inner circular conductors 32 and 33 respectively. However, at the points at which they cross over the outer circular conductor 31, they are electrically insulated from same. In relation to each of the conductor portions 51–58, a respective conductor portion 61–68 which initially also extends radially and which is electrically conductively connected to the outer circular conductor 31 extends outwardly in congruent relationship in the respective other conductor track plane. At a radial spacing at which the radial leakage fields have substantially decayed, the conductor portions 61–68 depart from being in congruent relationship with their associated conductor portions 51–58. The conductor portions 61–64 terminate with their associated conductor portions 51–54 at pairs of connecting contacts 70–73 while the conductor portions 65–68 are connected to their associated conductor portions 55–58 by way of respective controllable on/off switches 74–77.

While therefore the pairs of conductor portions 51, 61–54, 64 form connecting conductors, as have already been described with reference to FIG. 3, the pairs of conductor portions 55, 65–58, 68 which are respectively disposed in diametrally opposite relationship thereto form switchable separating limb portions which, when their associated on/off switch 74–77 is closed, separate from each other the surface element regions which immediately adjoin them in the peripheral direction, so that same belong to different surface elements in the same group. When the switch 74–77 is open, the respectively associated conductor portion 55–58 is without a separating limb effect so that surface element regions adjoining same belong to the same surface element.

In operation, there are always two of the four on/off switches 55–58 that are closed, while the other two are open. Which switches are open and closed depends on the respective position and direction movement of the transit surface defined by the end face 12.

If it is assumed for example that the transit surface is to advance in a counter-clockwise direction from the position shown in FIG. 4, the on/off switches 75 and 76 are closed and the separating limb portions 56, 57 associated therewith are effective. As each of those separating limb portions is electrically conductively connected to the outer circular conductor 31 and one of the two inner circular conductors 32–33, two groups of surface elements are formed, which come radially into alignment and which are displaced relative to each other through 45° in the direction of displacement.

The one group of surface elements includes the two surface elements which each cover 180°, that is to say which are in the form of half a circular ring, and which extend from the separating limb portion 56 to the pair of connecting conductors 52, 62 while the other group includes the semi-circular surface elements which extend from the separating limb portion 56 to the pair of connecting conductors 53, 63. At the associated pairs of connecting contacts 71 and 72 respectively, the difference voltages $\Delta U_1$ and $\Delta U_2$ are taken off, for the range of movement of 45°, in which the end edge 25 of the end face 12 moves out of the illustrated position to the conductor portion 55 which is inoperable at that time, while the oppositely disposed end edge 26 goes to the conductor portion 51 which is also inoperable at that time.

In the one limit position of the rotary movement which has just been described above and which extends over 45°, the end edges 25, 26 are at an angular spacing of 90° and 45° respectively from the respectively most closely adjacent 'functioning' separating limb portion 56 and 57 respectively. In the other limit position those spacings are 90° and 45° respectively, and they therefore never fall below the value of 45°.

If the end edge 25 of the end face 12 moves further in the counter-clockwise direction beyond the 'inoperable' conductor portion 55, the switch 75 is immediately opened and the switch 77 is immediately closed. The former is required because otherwise the end edge 25 would be disposed at a smaller distance than the angular spacing of 45°, relative to the next adjacent 'active' separating limb portion; closure of the switch 77 is possible because the angular spacing of the end edge 26 from the separating limb portion 58 which has been freshly brought into operation is greater than 45°. In that new switch position, the difference signals are taken off at the connecting contact pairs 72 and 73.

Upon a continuing rotary movement, corresponding switching-over operations can be effected both in respect of the 'active' separating limb portions and also in respect of the pairs of connecting contacts which are used for taking off the difference signals $\Delta U_1$ and $\Delta U_2$, and it is possible to trace and measure rotary movements in both directions, which go over 360°, without the distance being less than the critical edge spacing angle $\propto = 45°$ which is assumed to apply here.

In that respect the principle is observed, that two difference signals are taken off at two groups of surface elements, the surface elements of one group supplementing each other to form a respective full circular ring. They are separated from each other by a radially extending separating limb portion which interconnects the inner and outer circular conductors, on the one hand, and on the other hand by a diametrally oppositely disposed pair of connecting conductors at which the respective difference voltage occurs. The two groups which are formed in that way are displaced through 45° relative to each other and they supply two difference signals which are 'phase-shifted' relative to each other and which are used in the above-described manner for the intermediate signal and quotient formation operation.

The essential difference in relation to the embodiments described with reference to FIG. 3 is that the angular position of the groups of surface elements is not invariably fixed. On the contrary in this case the groups of surface elements can 'move along' with the transit surface, by virtue of opening and closing of the on/off switches 74–77. That 'movement' of the transit surface is so controlled that the angular spacing between one of the end edges 25, 26 and the most closely adjacent effective separating limb portion or the most closely adjacent effective connecting conductor is never less than 45°. This system therefore provides a measurement coil arrangement 50 with two conductor track planes, which satisfies the high levels of requirement in regard to linearity and symmetry in respect of the measurement signal, corresponding to that large angle $\propto$.

The two difference signals required for the quotient formation operation do not have to be taken off simultaneously at any time and passed for further processing. On the contrary they can also be taken off successively and subjected to further processing initially by a single-channel procedure. One of the derived signals produced in that way is then always put into intermediate storage until the respective other signal is available in the same form for common further processing. A measurement coil arrangement 50' which is suitable for that purpose, being shown in FIG. 5, affords the advantage that one of the two inner circular conductors, for example the conductor 33, can be omitted. Then, the remaining inner circular conductor 32' is connected to all conductor portions 51'–58', that is to say in particular also the conductor portions 52', 54', 56' and 58'. In that case the conductor portions 51'–58' are disposed in the same conductor track plane with the circular conductor 32' while the outer circular conductor 31' is in the other conductor track plane. That design configuration provides a particularly single structure.

When the levels of retirement are somewhat lower, it is sufficient to provide only three switchable separating limb portions at angular spacings of 60° and three respectively diametrally oppositely disposed pairs of connecting conductors. In such an arrangement which also only requires two conductor track planes and a correspondingly smaller number of switches, it is then possible to maintain an edge spacing $\propto = 30°$.

The arrangements shown in FIGS. 4 and 5 afford advantages by virtue of the stabilising effect of the short-circuit currents flowing in the circular conductors 31, 32 and 33, or 31' and 32' respectively, in regard to the monotony of the measurement signal. It will be appreciated however that in this case, because of those currents, the path resistances in the measurement coil turns which embrace surface elements which go together to form a respective group must be equal, with a high degree of accuracy. That can be achieved by virtue of the printed circuit forming the measurement coils being of a highly accurate configuration, in regard to conductor track width and thickness, or by subsequent compensation for example by reducing the width of conductor track regions of excessively low resistance, in each segment. It will be appreciated however that that is highly expensive. It is substantially more advantageous, as shown in FIG. 5, for the circular closed conductors 31', 32' each to be provided from the outset with two mutually oppositely disposed interruptions which are shown on an excessive scale in FIG. 5, and for each of those interruptions to be bridged across by a resistor 78, 78' and 79, 79' respectively. The resistors 78, 78' and 79, 79' which are connected in series with each other within a respective conductor 31' and 32' respectively must then be of resistance values which are of equal magnitude with the desired degree of measurement accuracy and which are high in comparison with the differences in resistance of the conductor tracks, but there must only be one thereof per 180°. If the differences in respect of the conductor track resistance values are for example between 1 m$\Omega$ and 2 m$\Omega$, it is sufficient to choose a resistance value of between 10 $\Omega$ and 20 $\Omega$ for a level of accuracy of $1:10^4$, for the resistors 78, 78', 79, 79'. In that respect the exact resistance value is not an important consideration. The only requirement is that the respective pairs of resistors 78, 78' and 79, 79' respectively must have resistance values which accurately coincide at $1:10^4$. The resistors 78, 78' which bridge over the mutually diametrally oppositely disposed interruptions in the outer circular conductor 31', unlike the configuration shown in FIG. 5, may be disposed in other coil segments from the resistors 79, 79' of the inner circular conductor 32'. The arrangement shown in FIG. 5 is preferred however because it permits the connections or terminals of the exciter coil (not shown) which concentrically surrounds the region of the end face 17 and which can also be provided on the same printed circuit board as the measurement coils in the form of a printed circuit to be passed outwardly through beneath the resistors, without a change of plane.

Figure 6:
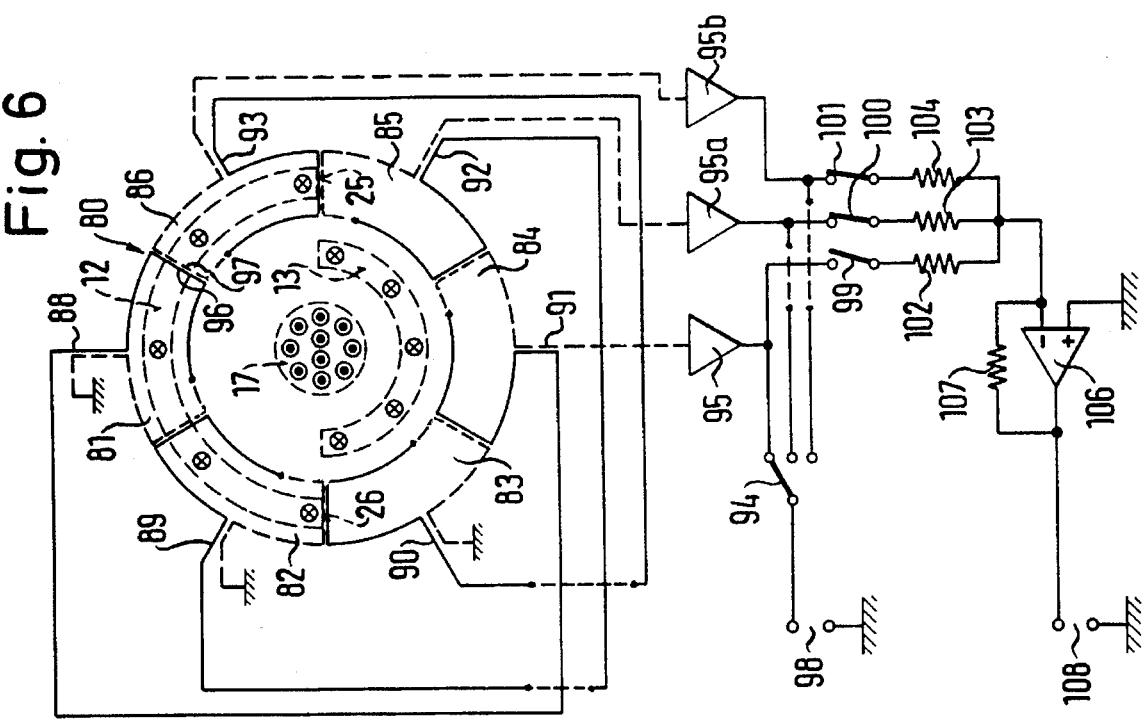
FIG. 6 shows a measurement coil arrangement for the rotary pick-up of FIGS. 1 and 2, with six surface elements which adjoin each other and which each extend over 60° with the associated circuit arrangement for producing the intermediate signals.

In order to avoid the expenditure just indicated above, it may be advantageous to use measurement coil arrangements in which no currents worth mentioning flow in the measurement coil windings. FIG. 6 shows such a measurement coil arrangement 80 which includes six part-annular surface elements 81–86, each of which extends over an angle of 60° and which are of the same inside and outside radii which are somewhat smaller and somewhat larger respectively than the inside and outside radius respectively of the end face 12 which here too defines the transit surface.

The surface elements 81–86 are arranged in mutually adjoining relationship in such a way that they supplement each other to provide a full circular ring which is disposed concentrically with respect to the axis of rotation. Each surface element 81–86 is enclosed by its own measurement coil turn with its own pair of connecting conductors 88–93. Each measurement coil turn is disposed partly in the upper conductor track plane and partly in the lower conductor track plane so that the common edge regions of each two surface elements which adjoin each other in the peripheral direction, for example the surface elements 81 and 86, are formed by two radially extending edge conductors 96 and 97 which are admittedly shown side-by-side in FIG. 6 but which in actual fact are disposed in precisely congruent relationship one above the other.

Of the pairs of connecting conductors 88, 89 and 90 of the measurement coil turns of the surface elements 81, 82 and 83, a respective connecting conductor is connected to system ground while the other is connected to one of the connecting conductors of the measurement coil turn of the respective diametrally oppositely disposed surface element 84, 85 and 86 respectively. That mode of connection is so selected that the measurement coil turns which are respectively wired together are transited in opposite directions when going from the respective ground connection to the 'free' connection of the measurement coil turns of the surface elements 84, 85, 86.

Each of those 'free' connections is connected to one of three impedance converters 95, 95a, 95b which at the same time can also serve as pre-amplifiers. The output lines of the impedance converters 95, 95a, 95b lead on the one hand to three input contacts of a controllable switch 94 which can occupy three different positions in which it connects one or other of the three impedance converter outputs to a pair of output terminals 98. On the other hand the output lines of the impedance converters 95–95b go to three controllable on/off switchs 99, 100 and 101, each of which is connected in series with a resistor 102, 103, 104. Only extremely low currents flow in the measurement coil turns because of the high-resistance tapping by the impedance converters 95–95b so that resistance values of different low levels in the measurement coil loops do not influence the measurement result.

The terminals of the resistors 102–104, which are remote from the switches 99–101, are connected to each other and applied to the 'minus' input of a differential amplifier 106 whose output has a negative feedback by way of a resistor 107 to the 'minus' input and is also connected to a pair of output terminals 108. The 'plus' input of the operational amplifier 106 is connected to system ground.

This embodiment also provides that, for each angular position of the transit surface, there are formed two groups of surface elements, which are displaced relative to each other in respect of angle and whose edge conductors are at an angular spacing which never falls below a critical angle $\propto$, from the end edges 25, 26 of the end face 12. In the illustrated configuration, with six surface elements, the angle $\propto$ is of a value of 30°. In this case also it is possible to achieve a value for $\propto$ of 45°, with eight surface elements which are suitably designed, arranged and interconnected.

In the embodiment shown in FIG. 6, in the illustrated position of the transit surface, the one group includes the surface elements 81, 82 and 83 which supplement each other to form a semi-circular ring, on the one hand, and the surface elements 84, 85 and 86 which form the complementary semi-circular ring on the other hand, and the other group comprises the surface elements 82, 83, 84 which supplement each other to form a semi-circular ring, and the surface elements 85, 86, 81 which form the complementary semi-circular ring.

If now consideration is directed to the output voltages of the surface elements of the two groups, initially independently of the wiring configuration shown in FIG. 6, then it is possible to form the following difference voltages therefrom:

$$\Delta U_1 = U_{81} + U_{82} + U_{83} - (U_{84} + U_{85} + U_{86})$$

and $$\Delta U_2 = U_{82} + U_{83} + U_{84} - (U_{85} + U_{86} + U_{81})$$

Admittedly, the end edges 25 and 26 of the end face 12 are disposed directly at the edges between the surface elements 85, 86 and 82, 83 respectively. As however the above difference voltages only involve the sums of the voltages which are generated by the measurement coil windings of those surface elements, leakage field effects which occur here remain without any influence. The edge regions which are effective when this situation is considered are those between the surface elements 83, 84 and 86, 81 (first group) and between the surface elements 84, 85 and 81, 82 (second group) respectively. However, in the illustrated position, the end edges 25, 26 are at least at an angular spacing of 60° from those four edge regions, so that they can be displaced through 30° both in the clockwise direction and also in the opposite direction, without the angular value falling below the minimum angular spacing $\propto = 30°$. Therefore, for the above-indicated combinations of surface elements, there is a range of movement of 60° in which the level of linearity of the two difference signals $\Delta U_1$ and $\Delta U_2$ satisfies the requirements corresponding to a minimum angular spacing $\propto = 30°$.

If now the following quotient is formed:

$$\frac{\Delta U_1 + \Delta U_2}{\Delta U_1 - \Delta U_2} \quad (2)$$

then after cancellation of the identical voltages with opposite signs, that gives the expression:

$$\frac{2U_{82} + 2U_{83} - 2U_{85} - 2U_{86}}{2U_{81} - 2U_{84}} = \frac{(U_{82} - U_{85}) + (U_{83} - U_{86})}{(U_{81} - U_{84})} \quad (3)$$

It is precisely the three voltage differrences occurring in the last expression, which are formed by the fixed wiring configuration shown in FIG. 6 and which are available at the outputs of the impedance converters 95–95b. It can be shown that, for any position of the transit surface, intermediate signals with the required linearity can be formed from those three voltage differences $U_{82}-U_{85}$, $U_{83}-U_{86}$, $U_{81}-U_{84}$, and from those intermediate signals are produced various quotients which represent the measurement signal and in the case of each of which two other voltage differences form the intermediate signal in the numerator and the third voltage difference forms the intermediate signal in the denominator.

In the illustrated position of the switches 94 and 99–101, the voltage difference $U_{81}-U_{84}$ which forms an intermediate signal is available at the pair of output terminals 98, and the voltage differences $U_{82}-U_{84}$ and $U_{83}-U_{86}$ are summed by way of the resistance network 102–108 and the differential amplifier 106 with feedback resistor 107 so that the intermediate signal in the numerator in equation (3) can be taken off at the pair of output terminals 108. The gain factors of the impedance converters 95–97 and the differential amplifier are so matched to each other that the right quotient from equation (3) can be immediately formed from the intermediate signals at the pairs of output terminals 98 and 108 by a circuit arrangement (not shown).

Therefore, in this case also, by suitable actuation of the switches 94 and 99–100 it is possible to simulate the groups of surface elements 'moving along' with the transit surface, as was described hereinbefore with reference to FIGS. 4 and 5. In this case also the measurement signal formed from the above-indicated intermediate signals has the property that additive interference values are eliminated therefrom by virtue of the difference-forming operations and the influence of the multiplicative interference phenomena is eliminated by the quotient formation operation.

It will be seen that the voltage difference $U_{81}-U_{84}$ forming the denominator of the quotient at the right in equation (3) remains constant upon displacement of the transit surface from the illustrated position through 30° in one direction or the other, while $U_{82}-U_{85}$ and $U_{83}-U_{86}$ alter linearly in opposite relationship. That again gives a measurement signal having the desired linear configuration. The measurement coil arrangement 80 is distinguished by requiring a minimum of controllable switches and providing a little more resolution.

FIGS. 7 and 8 show an inductive linear pick-up or sensor 110 which includes a flux guide means of ferromagnetic material comprising a core 111 and a yoke 112.

The core 111 is in the form of an elongate rectangular parallelepiped. Incorporated into one flat side thereof are two grooves 114, 115 which extend parallel to the longitudinal edges over the entire length of the core and which extend into the core 111 perpendicularly downwardly over about four fifths of the thickness of the core 111. The grooves 114, 115 impart to the core 111 an E-shaped cross-section having three limbs 117, 118 and 119 which face upwardly in FIG. 8 and which are all of approximately the same width which in turn is approximately equal to the width of each of the grooves 114, 115. An exciter coil 120 which is not shown in FIG. 7 is wound around the one outer limb 117.

Mounted on the top side of the other outer limb 119 is a carrier board or plate member 122 with a measurement coil arrangement 125 which transversely covers over the top side of the limb 119 and the major part of the groove 114 which separates the limbs 118 and 119 from each other.

The core 111 is mounted on one of the two bodies (not shown), the mutual positioning or movement of which is to be detected and measured.

The yoke 112 is fixed to the other of the two bodies, the contours thereof being shown by dash-dotted lines in FIG. 7.

The movement between the core 111 and the yoke 112 takes place in the direction indicated by the double-headed arrow F in FIG. 6 and the yoke 112, in that direction, is of a considerable length which defines the maximum width of movement which can be detected and measured.

The yoke 112 is substantially in the form of a rectangular plate 126 which is elongated in the direction of movement and the width of which, transversely to the direction of movement, is equal to the width of the core 111. Parallelepipedic projections 127, 128 and 129 project from the yoke plate 126, towards the core 111.

The projection 129 extends over the entire length of the yoke 112 and, transversely to the direction of movement, is of a width which is equal to the width of the outer limb 117 of the core 111. Therefore, irrespective of the position of the yoke 112 relative to the core 111, a part of the surface of the projection 129, which is towards the core, is always disposed in opposite congruent relationship with the surface, which ms towards the yoke, of the limb 117 of the core 111. Those two surfaces enclose between them a gap 130 which only serves to permit friction-free movement between the core 111 and the yoke 112. The width of the gap 130 should be kept as small as possible, to reduce leakage fields.

The arrangement includes a plurality of projections 127 of the same dimensions which are arranged in a row in succession with their longitudinal directions parallel to the direction of movement, so that they are aligned with each other in the direction of movement. Their spacings in the direction of movement are equal to their length and the latter is somewhat larger than a third of the length of the measurement coil arrangement 125 in that direction.

The row of projections 127 is so arranged transversely to the direction of movement that the surfaces of the projections 127, which are towards the core 111, are disposed opposite to the surface, which is towards the yoke, of the middle limb 118 of the core 111, forming gaps 132, in a region in which there are no parts of the measurement coil arrangement 125.

The projections 128 are dimensioned and oriented in precisely the same way as the projections 127 but they are displaced relative thereto in the direction of movement in such a way that they lie opposite openings between respective projections 127, so that each spacing between two projections 127 is 'bridged over' by a projection 128, and vice-versa.

Transversely to the direction of movement, the row of projections 128 is so arranged that the surfaces of the projections 128, which are towards the core 111, are disposed opposite the surface, which is towards the yoke, of the outer limb 119 of the core 111, forming gaps 134, in a region in which the measurement coil arrangement 125 is positioned.

The flux guide means therefore guides the magnetic flux issuing from the exciter coil 120 on a plurality of annularly closed measurement paths and a plurality of annularly closed compensating paths.

Both kinds of paths initially extend from the outer limb 117 across the gap 130, though the projection 129 and the plate 126. Division then takes place therein and the compensating paths extend downwardly through those projections 127 which, at the moment in time being considered, are disposed opposite the top side of the middle limb 118, across the gaps 132 therebetween, through the middle limb 118 and through beneath the groove 115 back to the outer limb 117.

In comparison, the measurement paths pass through the projections 128 which, at the oment in time being considered, are disposed opposite the top side of the outer limb 119, across the interposed gaps 134 in which they pass through the measurement coil arrangement 125, and then through beneath the grooves 114, 115 to go back to the outer limb 117. The important consideration in that respect is that, by virtue of the above-described dimensioning of the grooves 114, 115, the limbs 117, 118 and 119 and the projections 127, 128 and 129, the reluctance of all measurement paths is equal to that of all compensating paths and the sum of the reluctances which form the gaps 132 and 134 is approximately equal to that of the gap 130.

The measurement coil arrangement 125 in FIG. 7 includes three continuous conductors 136, 137 and 138 which extend in the direction of displacement F and of which the conductor which is the 'lower' conductor in FIG. 7, namely the conductor 136, switches to and fro repeatedly between the two conductor track planes and is a component of the measurement coil turns of all surface elements. The two continuous conductors 137 and 138 which are 'upper' conductors in FIG. 7 are admittedly shown as being disposed side-by-side but in actual fact they are arranged in congruent relationship one above the other in the portions in which they extend parallel to each other. They also belong to the measurement coil turns of a plurality of surface elements.

Extending perpendicularly to the direction of displacement F are twelve boundary conductors 140–151 which are alternately electrically conductively fixedly connected to one of the two 'upper° continuous conductors 137 and 138 respectively, and which extend 'downwardly' beyond the 'lower' continuous conductor 136, without an electrically conducting connection occurring at the cross-over points. In the direction of displacement, the edge conductors 140–151 are at equal spacings from each other, which are each equal to a quarter of the length of the transit surfaces 128.

Starting from the conductor 136 which is the 'lower' conductor in FIG. 7 and which extends in the longitudinal direction, twelve connecting conductors 154–165 extend parallel to the twelve boundary conductors 140–151. The connecting conductors 154–165 are electrically conductively fixedly connected to the conductor 136 and, at least in the vicinity of the surface elements, extend in congruent relationship with the respectively associated boundary conductor 140–154.

Each of the eight pairs of conductors 140, 154; 141, 155; 142, 156; 143, 157 and 148, 162; 149, 163; 150, 164; 151, 165 which are disposed in FIG. 7 on the left-hand and the right-hand sides respectively of the measurement coil arrangement 25 and form pairs of edge conductors is connected to the terminals of a controllable on/off switch (not shown), by means of which the electrically conductive connection between the two conductors of the respective pair can be made or broken.

The four middle pairs of conductors 144, 158; 145, 159; 146, 160; 147, 161 on the other hand form pairs of connecting conductors at which difference voltages $\Delta U_1$, $\Delta U_2$ can be taken off.

The measurement coil arrangement 125 just described above represents the linear equivalent to the measurement coil arrangements 50 and 50' shown in FIGS. 4 and 5 respectively for a rotary pick-up or sensor, in which the groups of surface elements which supplement each other to form full circular rings can be imagined as being cut open along the switchable separating limb portions 54–58 and laid out straight. When that is done, the separating limb portions 54–58 become switchable 'left-hand' and 'right-hand' edges conductors 140– 143 and 148–151.

Therefore this arrangement also comprises four groups of surface elements which are arranged in displaced relationship with each other in the direction of displacement F by a quarter of the length of the transit surfaces 128. The two surface elements each belonging to a respective group directly adjoin each other in the direction of displacement F and their common edge region is formed by the respective connecting conductor 144–147. As can be seen from the following Table, three boundary or edge conductors always enclose a respective pair of surface elements which jointly form a group of surface elements:

| | 'Left-hand' edge conductor | Connecting conductor | 'Right-hand' edge conductor |
|---|---|---|---|
| 1st group | 140 | 144 | 148 |
| 2nd group | 141 | 145 | 149 |
| 3rd group | 142 | 146 | 150 |
| 4th group | 143 | 147 | 151 |

As was described above with reference to FIGS. 4 and 5, that arrangement makes it possible for two of the four groups of surface elements always to be 'activated' by closure of the associated switches while the respective two other groups remain de-activated. The voltage differences $\Delta U_1$ and a $\Delta U_2$ which are required for forming the intermediate signals are taken off at the connecting conductors of the 'activated' group.

In this case also the 'active' groups of surface elements can 'move along' with the transit surfaces 128 in such a way that a minimum spacing (corresponding to the above-indicated angle $\infty$) is constantly maintained between the 'left-hand' and 'right-hand' edges of the respectively effective transit surface or surfaces 128 and the effective edge conductors of the respective group of surface elements, and that, depending on magnitude, guarantees good to very good linearity of the voltage differences $\Delta U_1$, $\Delta U_2$ which are taken off, and thus also good to very good linearity of the intermediate and measurement signals which are formed therefrom.

Figure 9:
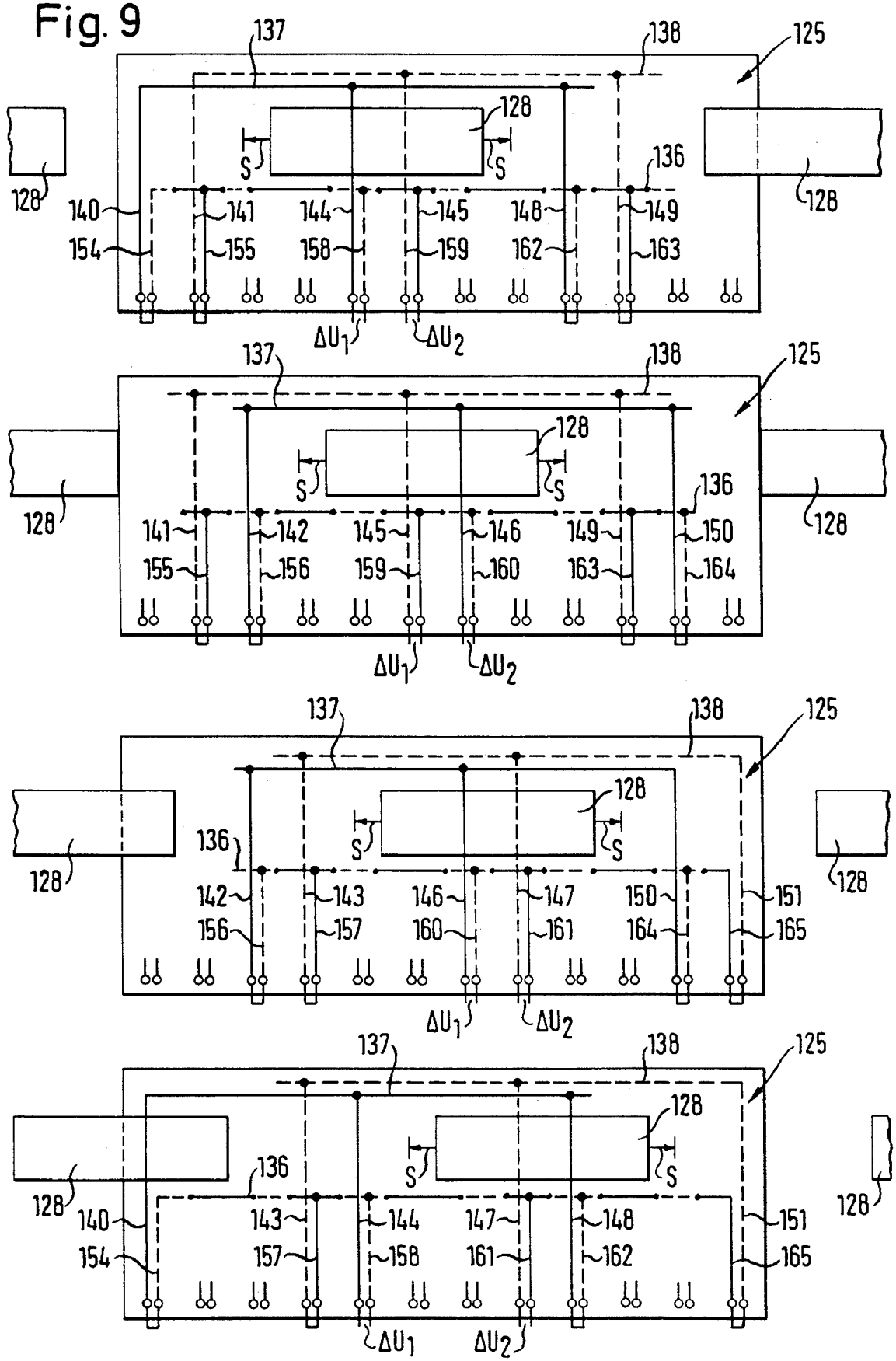
FIG. 9 shows views in diagrammatic form of four portions from the measurement coil arrangement of FIG. 7 for illustrating difference signal production in dependence on different positions of the transit surfaces.

That 'movement' of the active groups of surface elements with the transit surfaces is shown in FIG. 9 which illustrates four positions of the transit surfaces 128, which are singled out by way of example and in which the absolute values of $\Delta U_1$, $\Delta U_2$ are respectively equal so that their difference, formed with the correct sign, goes through zero. In that respect, only the 'effective' edge and connecting conductors are illustrated for each position, so that the effective groups of surface elements can be seen more clearly. The respectively closed on/off switches are symbolically represented by simple line connections.

Symmetrically relative to each of the four 'zero' positions, for the middle transit surface 128 there is a range of displacement towards the 'left' or 'right', as indicated by the arrows S, in which the spacing relative to the most closely adjacent effective edge conductor is not less than a minimum spacing which here is equal to a quarter of the length of the transit surfaces 128. The ranges of displacement as indicated at S, which are accessible from each 'zero position', are together of a length which is again equal to a quarter of the length of the transit surface.

For each of the four zero positions shown in FIG. 9, there is a 'complementary' zero position in which the three transit surfaces 128 illustrated are displaced by a transit surface length, so that they just cover over the openings shown in FIG. 9, between two successive transit surfaces. In those four 'complementary' positions, the same switches as in FIG. 9 are closed and the difference voltages $\Delta U_1$, $\Delta U_2$ are taken off at the same connecting conductors.

There are therefore a total of eight zero positions, from which it is possible to cover a range of linearity of $\pm\frac{1}{8}$th of the transit surface length, which satisfies very high requirements. As in total a displacement must be over two transit surface lengths in order to cover a full period length, the entire measurement range can be covered without any gap.

As is already the case with the corresponding rotary pick-up, in this case it is possible to provide only three groups of surface elements which are each displaced relative to each other by a third of the length of the transit surface, when the levels of requirement in respect of linearity are lower.

With the described linear pick-up, the same difference signals are obtained again after a displacement by two transit surface lengths. The uncertainty which is caused thereby can be eliminated for example by the lengths and/or spacings of the transit surfaces being varied over the entire length of movement to be covered, and by providing additional surface elements at whose connecting conductors position-dependent difference signals can be taken off in the periods of time in which the above-described surface elements supply constant output signals, by virtue of the irregular pitch or distribution.

In the case of the linear pick-up measurement coil arrangement shown in FIGS. 8 and 9, the current-flow resistances of the switches which must be actuated for the 'left-hand' and 'right-hand' edge conductors to 'move along' are in series in the closed condition with the series resistances of the measurement coil turns and the short-circuit currents generated in the measurement coil turns flow therethrough. So that the measurement results do not suffer from disturbances therefore, those switches must have current-flow resistances which are as low as possible and/or which present only extremely slight differences. Particularly if there is a wish to use semiconductor switches, as are available at the present time, that requirement cannot be met or it can be met only at considerable expense. In order to avoid those difficulties, it is desirable also to use for a linear pick-up or sensor, a linear measurement coil arrangement which corresponds to the example of the rotary pick-up or sensor shown in FIG. 6, as will now be described with reference to the embodiment shown in FIGS. 10 and 11.

This embodiment is also suited to situations of use in which the position of the yoke which closes the magnetic circuits, relative to the core, cannot be as exactly defined as was assumed to be the case with the example of FIGS. 7–9. Thus for example tank filling level indicators are known in which a vertically arranged cylindrical bar is coupled to a float in such a way that it moves vertically up and down with the float, according to the level of the liquid in the tank. However, in such an arrangement, such bars are only guided in respect of their displacement in the longitudinal direction, and can rotate freely about their longitudinal axis.

Figure 10:
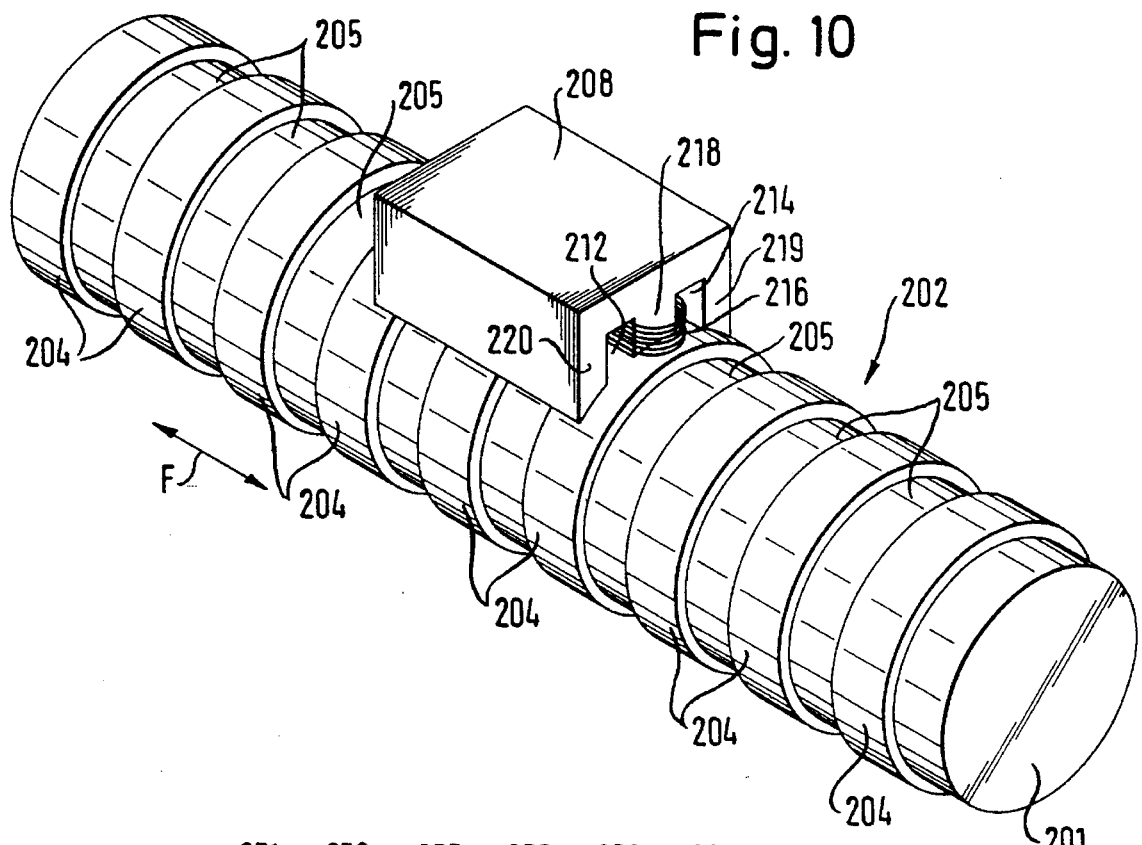
FIG. 10 is a simplified perspective view of a further linear pick-up or sensor.
Figure 11:
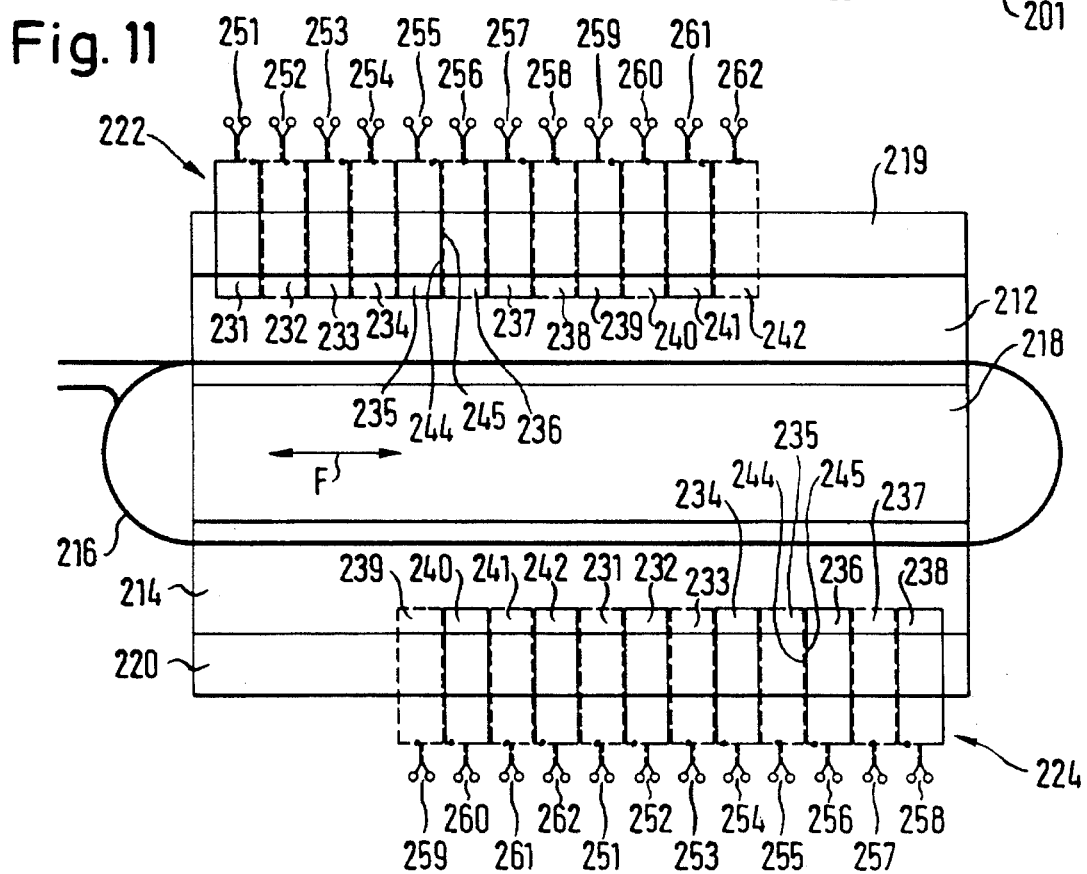
FIG. 11 is a diagrammatic view from below on an enlarged scale of the core of the linear pick-up in FIG. 10.

In the embodiment shown in FIGS. 10 and 11, such a bar 201 is in the form of a yoke 202 of an inductive linear pick-up or sensor 200, in that it carries a plurality of rings 204 comprising a material of high magnetic permeability, which are all of the same axial length and which are arranged at axial spacings from each other which systematically increase in a stepwise fashion from one end of the bar 201 to the other end, from a minimum value which is equal to the axial length of the rings 204. In that arrangement the bar 201 itself may comprise a non-ferromagnetic material. Preferably however the rings 204 are formed integrally with the bar 201, in that grooves 205 are milled into a cylindrical bar consisting of a ferromagnetic material, the diameter of the bar corresponding to the outside diameter of the rings, while the axial lengths of the grooves 205 define the spacings 205. To provide a smooth continuous surface, the grooves 205 can be filled with any suitable material of low magnetic permeability. The core 208 of the inductive linear sensor or pick-up 200, as in the embodiment shown in FIGS. 7 and 8, is in the form of an elongated parallelepiped having two grooves 212 and 214 which extend in the longitudinal direction and which are formed in the surface of the core 208, which is towards the yoke 202. That surface of the core 208 is part of the peripheral surface of a circular cylinder which is arranged coaxially with respect to the bar 201 in order that the gaps required for the relative movement between the core 208 and the yoke 202 can be kept as uniform and as narrow as possible.

The differences relative to the arrangement shown in FIGS. 7 and 8 are that in this case the exciter coil 216 is wound on to the middle limb 218 of the core 208 which is of E-shaped cross-section and the two outer limbs 219 and 220 respectively define a measurement path or a compensating path, insofar as a specific measurement coil arrangement 222 and 224 is disposed in the region of the gaps which the limbs form relative to the yoke 202. To provide symmetry in respect of magnetic reluctances, which is important, the width of the two outer limbs 219 and 220 is the same and in each case is about half as large as that of the middle limb 218. The present form of the core is the best way of achieving symmetry.

The measurement coil arrangements 222 and 224 diagrammatically shown in FIG. 11 are each in the form of a printed circuit, FIG. 11 illustrating only the conductor track configuration. In this case also, conductor track portions which are shown by solid lines are disposed on the side of the circuit board (not shown) which is towards the viewer, while conductor tracks shown in broken lines extend on the side remote from the viewer. Penetration points at which conductor tracks in electrically conductively connected relationship change from one side of the circuit board to the other are indicated by dot-shaped enlargements. An important consideration is that, in this case also, conductor track portions which are shown as being disposed in closely parallel and side-by-side relationship on different surfaces are in actual fact arranged in congruent relationship one above the other on the two sides of the circuit board.

While the measurement coil arrangement in FIG. 7 forms the linear variant of the rotary pick-up measurement coils shown in FIGS. 4 and 5, each of the measurement coil arrangements 222 and 224 corresponds to the rotary pick-up configuration shown in FIG. 6, with the difference that, instead of the six surface elements 81–85 covering the measurement path in that arrangement, here there are eight surface elements 231–238 which are in the form of elongate rectangles and which are so dimensioned and arranged side-by-side that their longitudinal axes extend perpendicularly to the direction of displacement (arrow F) and in that direction they cover just a 'period' of the measurement path, which is equal to double the axial length of one of the rings 204. In each of the two measurement coil arrangements 222 and 224, adjoining the eight surface elements 231–238 which under ideal conditions are sufficient for measurement purposes are four further identically arranged surface elements 239–242, the significance of which will be described in greater detail hereinafter.

Each of the surface elements 231–242 is enclosed by its own measurement coil turn with its own pair of terminals 251–262 and is disposed partly in the upper conductor track plane and partly in the lower plane so that the common edge regions of each two surface elements which adjoin in the direction of displacement are formed by two edge conductors which extend perpendicularly to the direction of displacement and which are shown side-by-side in FIG. 11, although in actual fact they are disposed precisely in congruent relationship one above the other. That applies not only in regard to the pairs of edge conductors 244, 245 of the surface elements 235, 236, which are singled out by way of example, but also in the same manner in regard to all other pairs of edge conductors.

The voltages which are induced in the measurement coil turns are taken off at high resistance at the pairs of connecting conductors 251–262 so that the low-resistance series resistances have no influence. Therefore differences in the conductor track resistances cannot influence the measurement result.

In this case also, for the purposes of forming difference signals $\Delta U_1$ and $\Delta U_2$, the output voltages of the measurement coil turns are combined together in a similar fashion as was described above in regard to the measurement coil arrangement shown in FIG. 6.

The following for example apply:

$$\Delta U_1 = U_{231} + U_{232} + U_{233} + U_{234} - (U_{235} + U_{236} + U_{237} + U_{238})$$

and $$\Delta U_2 = U_{232} + U_{233} + U_{234} + U_{235} - (U_{236} + U_{237} + U_{238} + U_{231})$$

wherein the voltages $U_{236}$ to $U_{238}$ are always so combined together that leakage field effects which occur at the axial edges of the rings 204 do not influence the linear configuration of the difference voltages $\Delta U_1$ and $\Delta U_2$.

If the quotient corresponding to above equation (2) is formed, then, in a similar fashion to equation (3), that gives the following expression:

$$\frac{(U_{232} - U_{236}) + (U_{233} - U_{237}) + (U_{234} - U_{238})}{(U_{231} - U_{235})}$$

It can also be shown here that, for any position of the transit surface defined by one of the rings 204, relative to one of the measurement coil arrangements 222 or 224, intermediate signals with the required linearity can be formed from those four voltage differences, and from those intermediate signals various quotients representing the measurement signal are formed, in each of which three other voltage differences form the numerator and the fourth voltage difference forms the denominator.

The points just set forth above also apply when, unlike the above-described structure, all grooves 205 are of the same axial length. In that case only one of the measurement coil arrangements 222 or 224 is required. It will be appreciated that such an arrangement can only produce fine measurement values which exactly reproduce the instantaneous position of that one of the rings 204 which is precisely in the region of the measurement coil arrangement. It is not possible to establish however which one of the rings 204 that is.

In order to be able to detect the latter factor, the embodiment shown in FIGS. 10 and 11 provides that a coding is applied by the described variation in the spacings of the rings 204, and the second measurement coil arrangement 224 is disposed in the compensating path, the measurement coils thereof being arranged in displaced relationship in the direction of movement relative to the measurement coils of the first measurement coil arrangement 222, by two ring lengths, that is to say by eight surface element widths. That second measurement coil arrangement 224 also makes it possible to produce a fine measurement value which reproduces the exact position of a ring 204 adjacent to the ring 204 at the first measurement coil arrangement 222, with respect to the second measurement coil arrangement 224.

As however all the spacings between mutually adjacent rings 204 are different, not only do the fine measurement values which can be produced by the two measurement coil arrangements 222 and 224 differ, but in addition they involve different differences for each pair of mutually adjacent rings 204.

Thus, from a comparison in respect of the two fine measurement values, that gives a coarse measurement value which permits the position of the core 208 to be clearly defined with respect to the yoke 202, over the entire length thereof.

In order to achieve that, assuming ideal adjustment of the core 208 with respect to the yoke 202, the 'outer' eight surface elements 231–238 which are so arranged that the one group of measurement coils exactly adjoins the other in the longitudinal direction would be sufficient, in each of the measurement coil arrangements 222 and 224. If however the longitudinal axis of the core 208 and/or the measurement coil arrangements 222 and 224 is tilted relative to the longitudinal axis of the yoke 202, it can happen that leakage field lines which with the edge of a ring 204 move beyond the last surface element 238 of the one measurement coil arrangement 222 do not immediately pass into the first surface element 231 of the other measurement coil arrangement 224 (or vice-versa). In order to prevent that phenomenon from adversely affecting the degree of measurement accuracy and linearity, it is therefore desirable for the two arrangements to be disposed in overlapping relationship, and that is achieved by the four further surface elements 239–248 which are provided in each case.

A further advantage of those four additional surface elements in each case is that the relative movement of a ring 204 can be traced and measured for a longer period of time by repeatedly switching over to fresh surface elements within a measurement coil arrangement, so that, in spite of the spacings between adjacent rings 204 varying from one pair of rings to another, that arrangement always ensures that the fine measurement value produced by the one measurement coil arrangement 222 or 224 exactly follows that of the other measurement coil arrangement.

In all described embodiments in which different measurement coil turns can be used at different times for forming difference signals, by means of switches or change-over switching devices, such switches or change-over switching devices can be combined to provide a multiplexer which forms the input stage of the circuit arrangement which is connected on the output side of the respective measurement coil arrangement for evaluating the measurement coil signal and ascertaining the measurement value.

It will be appreciated that the above-described constructions have been set forth solely by way of example and illustration of the principles of the present invention and that various modifications may be made therein without thereby departing from the spirit and scope of the present invention.

It will be further appreciated that the reference numerals contained in the appended claims serve for ease of interpretation thereof and are not intended to have a restrictive effect.

What is claimed is:

1. In a pick-up for the inductive production of a measurement signal which reproduces the positions occupied by first and second mutually movable bodies with respect to each other, including at least one exciter coil, means for feeding the exciter coil with alternating current to generate a magnetic flux, a measurement coil arrangement at which signals from which the measurement signal is derived can be taken off, and a flux guide means of ferromagnetic material which carries the magnetic flux generated by the exciter coil in a closed measurement path in such a way that at least a part of the magnetic flux passes through the measurement coil arrangement and at least one of the signals taken off at the measurement coil arrangement changes in dependence on the movement of one of said bodies relative to the other, the improvement wherein the measurement coil arrangement comprises at least two groups of measuring coils, each group being composed of at least two measuring coils which are electrically connected to each other such that they produce a common output signal which is the difference signal of signals generated by the at least two measuring coils of the respective group, and wherein an electrical circuit arrangement is provided to which the common output signals of said at least two groups of measuring coils are fed and which combines said common output signals to first and second intermediate signals of which at least one depends on the instantaneous position of one of the bodies relative to the other, which electric circuit arrangement forms the measurement signal as a quotient of said first and said second intermediate signals.

2. A pick-up as set forth in claim 1 wherein the measurement coil arrangement (30; 50; 80; 125) has at least one turn enclosing at least one surface element (40, 41, 42, 43; 81–86) and wherein said measurement path has at least one gap (21; 134), in the region of which said measurement coil arrangement (30; 50; 80; 125) is so positioned that the at least one surface element (40, 41, 42, 43; 81–86) is adapted to be transited by at least part of the magnetic flux crossing over in the gap (21; 134), said part changing in dependence on the movement of one of said bodies relative to the other.

3. A pick-up as set forth in claim 1 wherein the flux guide means (2, 4; 111, 112) for the magnetic flux generated by the exciter coil (7; 120) predetermines at least one further closed compensating path for carrying the magnetic flux passing therethrough, past the measurement coil arrangement (30; 50; 180; 125), said at least one compensating path having at least one gap (21; 132).

4. A pick-up as set forth in claim 2 wherein surface elements (40, 41, 42, 43; 81–86) of the measurement coil arrangement (30; 50; 80; 125) are each enclosed by a single said measurement coil turn and are arranged approximately in a common surface, the projection of a gap wall (12) in the direction of the magnetic flux which crosses over in the gap (21; 134) on to the surface of the surface elements (40, 41, 42, 43; 81–86) forms a transit surface which is displaceable relative to the surface elements in a direction of displacement which depends on the movement of one of said bodies relative to the other, the surface elements (40, 41, 42, 43; 81–86) are combined together to form at least two groups which are arranged in displaced relationship with each other in the direction of displacement and each of which includes at least two surface elements which adjoin each other in the direction of displacement, and the one voltage difference ($\Delta U_1$, $\Delta U_2$) required for formation of the intermediate signals is derived from the one group and the other said voltage difference is derived from the other group.

5. A pick-up as set forth in claim 4 wherein said surface elements (40, 41, 42, 43; 81–86) and said at least one transit surface are geometrically similar to each other and are in the shape of elongate quadrilaterals whose long sides extend at least substantially parallel to each other and to the direction of displacement and whose short sides extend at least substantially perpendicularly to the direction of displacement.

6. A pick-up as set forth in claim 5 wherein said surface elements (40, 41, 42, 43; 81–86) are of larger dimensions than the transit surface perpendicularly to said direction of displacement.

7. A pick-up as set forth in claim 5 wherein said surface elements (40, 41, 42, 43; 81–86) which form a group have at least one common edge portion which extends at least substantially perpendicularly to the direction of displacement.

8. A pick-up as set forth in claim 7 and further including, extending along the mutually adjoining sides, which extend in the direction of displacement, of first and second adjacent surface elements (40, 41, 42, 43), a respective continuous conductor (31, 32, 33) which belongs to the measurement coil turns of both surface elements (40, 41, 42, 43) and wherein a common edge portion of said surface elements (40, 41, 42, 43) is formed by a conductor (34, 35, 44, 45; 51–58) which extends at least substantially transversely to the direction of displacement and which is electrically conductively fixedly connected to at least one of said continuous conductors (32, 33).

9. A pick-up as set forth in claim 8 wherein said transversely extending conductor (34, 44) is a fixed-wired limb portion, by virtue of the fact that it is also electrically conductively fixedly connected to the second said continuous conductor (31).

10. A pick-up as set forth in claim 8 including a controllable on/off switch (74, 75, 76, 77) operatively disposed between said transversely extending conductor (55, 56, 57, 58) and the second continuous conductor (31), whereby said transversely extending conductor (55, 56, 57, 58) is formed as a switchable separating limb portion, by virtue of being connectable to the second continuous conductor (31) via said switch.

11. A pick-up as set forth in claim 8 wherein said transversely extending conductor (35, 45; 51, 52, 53, 54) is formed as a connecting conductor, by virtue of the fact that it extends across the second continuous conductor (31) without electrically conductive connection thereto.

12. A pick-up as set forth in claim 2 wherein surface elements (40, 42, and 41, 43) belong to different groups and have in common at least one conductor (31, 32, 33) which extends in the direction of displacement.

13. A pick-up as set forth in claim 7 wherein said common edge portion is formed by first and second conductors (96, 97) which, as viewed in the direction of the magnetic flux which can pass through the surface elements (81–86), are arranged one behind the other at a small spacing and in coincident relationship with each other.

14. A pick-up as set forth in claim 13 including a plurality of surface elements (81–86) which are arranged in succession in the direction of displacement and which each adjoin each other with common edge portions, wherein the measurement coil turns which enclose the various surface elements (81–86) are formed by mutually independent conductors, and wherein the output voltages ($U_{81}$–$U_{86}$) of the various measurement coil turns are adapted to be combined together alternately to produce said intermediate signals.

15. A pick-up as set forth in claim 2 in the form of a rotary pick-up wherein the surface elements (40, 41, 42, 43; 81–86) are disposed in a plane which extends at least substantially perpendicularly to the axis of rotation of the movement of one of said bodies relative to the other, and wherein the surface elements (40, 41, 42, 43; 81–86) and the transit surface are in the form of parts of circular rings which are arranged at least substantially concentrically relative to the axis of rotation.

16. A pick-up as set forth in claim 8 wherein the surface elements (40, 41, 42, 43) are defined on the radially outward side by a common at least substantially circular closed conductor (31) and on the radially inward side by first and second at least substantially circularly closed conductors (32, 33) which are disposed at a small spacing in congruent relationship one behind the other in the direction of the magnetic flux through the surface elements (40, 41, 42, 43).

17. A pick-up as set forth in claim 8 wherein the surface elements on the radially inward side are defined by a common at least substantially circular closed conductor and on the radially outward side by first and second at least substantially circular closed conductors which are disposed at a small spacing in congruent relationship one behind the other in the direction of the magnetic flux through the surface elements.

18. A pick-up as set forth in claim 16 wherein each group of surface elements (40, 41 and 42, 43) includes first and second surface elements which are each at least substantially in the form of half a circular ring and which supplement each other to provide a closed circular ring.

19. A pick-up as set forth in claim 17 wherein each group of surface elements (40, 41, and 42, 43) includes first and second surface elements which are each at least substantially in the form of half a circular ring and which supplement each other to provide a closed circular ring.

20. A pick-up as set forth in claim 15 wherein the surface elements (40, 41, 42, 43) are defined on the radially outward side by a common at least substantially circular closed conductor (31) and on the radially inward side by first and second at least substantially circularly closed conductors (32, 33) which are disposed at a small spacing in congruent relationship one behind the other in the direction of the magnetic flux through the surface elements (40, 41, 42, 43).

21. A pick-up as set forth in claim 15 wherein the surface elements on the radially inward side are defined by a common at least substantially circular closed conductor and on the radially outward side by first and second at least substantially circular closed conductors which are disposed at a small spacing in congruent relationship one behind the other in the direction of the magnetic flux through the surface elements.

22. A pick-up as set forth in claim 18 comprising first and second groups of surface elements, which are arranged in displaced relationship relative to each other through 180°, the arrangement being such that the intermediate signals are taken off at the connecting conductors thereof.

23. A pick-up as set forth in claim 18 comprising first, second and third groups of surface elements, which are arranged in displaced relationship relative to each other through 120°, the arrangement being such that the intermediate signals are each taken off at the connecting conductors of the first and second groups whose common edge regions are at the greater angular spacings from the ends of the part-circular transit surface.

24. A pick-up as set forth in claim 16 comprising a plurality of surface elements which are each at least substantially in the form of part of a circular ring and which supplement each other to provide a full circular ring, wherein there are always first and second at least substantially radially extending conductors (51, 55; 52, 56; 53, 57; 54, 59) which are disposed in at least substantially diametrally opposite relationship and of which a respective one forms a switchable limb portion and one forms a connecting conductor.

25. A pick-up as set forth in claim 24 comprising eight surface element portions each extending over 45°, wherein the transversely extending conductor portions (51–58) are alternately electrically conductively fixedly connected to the one and the other of the congruent circular conductors (32, 33).

26. A pick-up as set forth in claim 17 comprising a plurality of surface elements which are each at least substantially in the form of part of a circular ring and which supplement each other to provide a full circular ring, wherein there are always first and second at least substantially radially extending conductors (51, 55; 52, 56; 53, 57; 54, 59) which are disposed in at least substantially diametrally opposite relationship and of which a respective one forms a switchable limb portion and one forms a connecting conductor.

27. A pick-up as set forth in claim 17 comprising eight surface element portions each extending over 45°, wherein the transversely extending conductor portions (51–58) are alternately electrically conductively fixedly connected to the one and the other of the congruent circular conductors (32, 33).

28. A pick-up as set forth in claim 14 including an even number of surface elements (81–86) which are each at least substantially in the form of part of a circular ring and which supplement each other to provide a full circular ring, wherein the connecting conductors (88, 91; 89, 92; 90, 93) of the measurement coil turns of each two mutually oppositely disposed surface elements (81, 84; 82, 85; 83, 86) are wired together to form the differences ($U_{81}-U_{84}$; $U_{82}-U_{85}$; $U_{83}-U_{86}$) of their voltages, and further including a controllable switch arrangement (94, 99, 100, 101), by means of which the voltage differences are used alternately to form the intermediate signals in dependence on the instantaneous position of the transit surface.

29. A pick-up as set forth in claim 15 including an even number of surface elements (81–86) which are each at least substantially in the form of part of a circular ring and which supplement each other to provide a full circular ring, wherein the connecting conductors (88, 91; 89, 92; 90, 93) of the measurement coil turns of each two mutually opposite disposed surface elements (81, 84; 82, 85; 83, 86) are wired together to form the differences ($U_{81}-U_{84}$; $U_{82}-U_{85}$; $U_{83}-U_{86}$) of their voltages, and further including a controllable switch arrangement (94, 99, 100, 101), by means of which the voltage differences are used alternately to form the intermediate signals in dependence on the instantaneous position of the transit surface.

30. A pick-up as set forth in claim 2 in the form of a linear pick-up wherein the surface elements are disposed in a plane which extends at least substantially parallel to the direction of movement of one of the bodies relative to the other, and wherein the at least one transit surface and the surface elements are in the shape of elongate rectangles extending in the direction of movement.

31. A pick-up as set forth in claim 30 wherein the flux guide means (111, 112) is of such a configuration that, on passing through the range of movement of one of the bodies relative to the other, a plurality of transit surfaces which are spaced from each other in the direction of movement are displaced successively over the surface elements.

32. A pick-up as set forth in claim 31 wherein the transit surfaces are of at least substantially equal lengths and at at least substantially equal spacings in the direction of displacement and wherein said lengths and spacings are of at least substantially equal magnitude.

33. A pick-up as set forth in claim 30 wherein the surface elements of the various groups, on the one side which extends parallel to the direction of displacement, are defined by a common continuous conductor and on the opposite side which is parallel to the direction of displacement by first and second continuous conductors which lie at a small spacing in congruent relationship one behind the other in the direction of the magnetic flux through the surface elements.

34. A pick-up as set forth in claim 33 wherein each group of surface elements includes two surface elements at least substantially in the form of elongate rectangles which adjoin each other in the direction of displacement with a common edge region and which are each of a length that is at least substantially equal to the length of the transit surfaces.

35. A pick-up as set forth in claim 34 wherein the surface elements of a group are defined at their end edges which are disposed opposite the common edge region by a conductor which extends transversely to the direction of displacement and which is electrically conductively fixedly connected to one of the continuous conductors extending in the direction of displacement, and is adapted to be connected to another continuous conductor extending in the direction of displacement, by a controllable on/off switch.

36. A pick-up as set forth in claim 35 comprising four groups of surface elements, which are respectively displaced relative to each other by a quarter of the length of the transit surfaces in the direction of displacement, of which groups the two respective groups whose end edges are at the greater spacings from the leading and trailing edges respectively of the transit surfaces, in the direction of displacement, are used to produce the voltage differences ($\Delta U_1$, $\Delta U_2$) required for forming the intermediate signals, by closure of the associated on/off switches.

* * * * *